(12) United States Patent
Amako et al.

(10) Patent No.: US 6,635,850 B2
(45) Date of Patent: Oct. 21, 2003

(54) LASER MACHINING METHOD FOR PRECISION MACHINING

(75) Inventors: Jun Amako, Suwa (JP); Masami Murai, Suwa (JP); Tsutomu Ota, Suwa (JP); Tomio Sonehara, Suwa (JP)

(73) Assignee: Seiko Epson Corporation (JP)

(*) Notice: Subject to any disclaimer, the term of this patent is extended or adjusted under 35 U.S.C. 154(b) by 53 days.

(21) Appl. No.: 10/047,952

(22) Filed: Jan. 15, 2002

(65) Prior Publication Data

US 2002/0139786 A1 Oct. 3, 2002

Related U.S. Application Data

(63) Continuation of application No. 09/321,802, filed on May 27, 1999, now Pat. No. 6,376,799, which is a division of application No. 08/890,128, filed on Jul. 9, 1997, now Pat. No. 6,031,201, which is a continuation of application No. 08/385,932, filed on Feb. 3, 1995, now abandoned, which is a continuation-in-part of application No. PCT/JP94/00912, filed on Jun. 6, 1994.

(30) Foreign Application Priority Data

| Jun. 4, 1993 | (JP) | 5-134735 |
| Jul. 6, 1993 | (JP) | 5-167125 |
| Jul. 6, 1993 | (JP) | 5-167126 |
| Jul. 28, 1993 | (JP) | 5-186442 |
| Sep. 27, 1993 | (JP) | 5-240090 |
| Jan. 19, 1994 | (JP) | 6-4244 |

(51) Int. Cl.$^7$ ................. B23K 26/36; B23K 26/06
(52) U.S. Cl. ................. 219/121.76; 219/121.69
(58) Field of Search ................. 219/121.76, 121.77, 219/121.73, 121.75, 121.68, 121.69

(56) References Cited

U.S. PATENT DOCUMENTS

| 3,571,554 A | 3/1971 | Baujoin | 219/121.75 |
| 4,265,254 A | 5/1981 | Koch et al. | 219/121.7 |

(List continued on next page.)

FOREIGN PATENT DOCUMENTS

| EP | 0 200 089 | 12/1986 |
| EP | 0 308 512 | 3/1989 |

(List continued on next page.)

OTHER PUBLICATIONS

Ito et al, "A Study of Ablation by Short Wavelength Pulse Laser—A Photothermal Modeling for Etching Mechanism of Polymer", JSPE–59–03, pp. 105–110.

Kirkpatrick et al, "Optimization by Simulated Annealing", Science, vol. 220, May 13, 1983, pp. 671–680.

Morrison et al, "Beam Array Generation and Holographic Interconnections in a Free–Space Optical Switching Network":, Applied Optics, vol. 32, No. 14, May 10, 1993, pp. 2512–2518.

Vasara et al, "Binary Surface–Relief Gratings for Array Illumination in Digital Optics", Applied Optics, vol. 31, No. 17, Jun. 10, 1992, pp. 3320–3336.

*Primary Examiner*—Geoffrey S. Evans
(74) *Attorney, Agent, or Firm*—Harness, Dickey & Pierce, P.L.C.

(57) ABSTRACT

A laser machining method and apparatus performs high-speed and high-precision machining on a thin film and a liquid crystal panel. The apparatus includes: a plurality of pulse laser generators, drivers for alternately driving a plurality of pulse laser generators to generate laser beams delayed in phase between each other; collimators for making the generated laser beams equal in quality; a wave plate for converting the laser beams into elliptically polarized laser beams; and a phase grating for dividing each laser beam emitted by each of the plurality of laser beam generators into a plurality of laser beams; such that an object to be processed is selectively illuminated with the plurality of laser beams produced by the phase grating. The phase grating has structure on its surface for dividing each of the laser beams into equal intensity beams. Open grooves are formed having uniform shape and quality.

14 Claims, 23 Drawing Sheets

U.S. PATENT DOCUMENTS

| | | | |
|---|---|---|---|
| 4,404,454 A | 9/1983 | Taylor et al. | 219/121.75 |
| 4,870,244 A | 9/1989 | Copley et al. | 219/121.7 |
| 4,947,023 A | 8/1990 | Minamida et al. | 219/121.68 |
| 4,970,366 A | 11/1990 | Inatou et al. | 219/121.75 |
| 4,997,250 A | 3/1991 | Ortiz, Jr. | 219/121.75 |
| 5,017,755 A | 5/1991 | Yahagi et al. | 219/121.75 |
| 5,029,243 A | 7/1991 | Dammann et al. | 219/121.77 |
| 5,057,664 A | 10/1991 | Johnson et al. | 219/121.69 |
| 5,227,607 A | 7/1993 | Ishiyama | 219/121.73 |
| 5,237,149 A | 8/1993 | Macken | 219/121.73 |
| 5,362,940 A | 11/1994 | MacDonald et al. | 219/121.73 |
| 5,373,137 A | 12/1994 | McLaughlin | 219/121.77 |
| 5,463,200 A | 10/1995 | James et al. | 219/121.77 |
| 5,521,628 A | 5/1996 | Montgomery | 347/243 |
| 5,571,429 A | 11/1996 | Smith et al. | 219/121.73 |
| 5,587,094 A | 12/1996 | Yoshida et al. | 219/121.73 |
| 5,670,069 A | 9/1997 | Nakai et al. | 219/121.73 |
| 5,708,252 A | 1/1998 | Shinohara et al. | 219/121.73 |
| 5,922,224 A | 7/1999 | Broekroelots | 219/121.72 |
| 6,031,201 A | 2/2000 | Amako et al. | 219/121.77 |

FOREIGN PATENT DOCUMENTS

| | | | | |
|---|---|---|---|---|
| JP | 59-179285 | 10/1984 | | |
| JP | 60-196282 | 10/1985 | | |
| JP | 60-261142 | 12/1985 | | |
| JP | 61-89636 | 5/1986 | | |
| JP | 61-249693 | 11/1986 | | |
| JP | 01-254392 | 10/1989 | | |
| JP | 1-296623 A | * 11/1989 | | 219/121.69 |
| JP | 02-259727 | 10/1990 | | |
| JP | 3-487 A | * 1/1991 | | 219/121.68 |
| JP | 04-089192 | 3/1992 | | |
| JP | 04-135083 | 5/1992 | | |
| JP | 04-266492 | 9/1992 | | |
| JP | 08-276288 | 10/1996 | | |

* cited by examiner

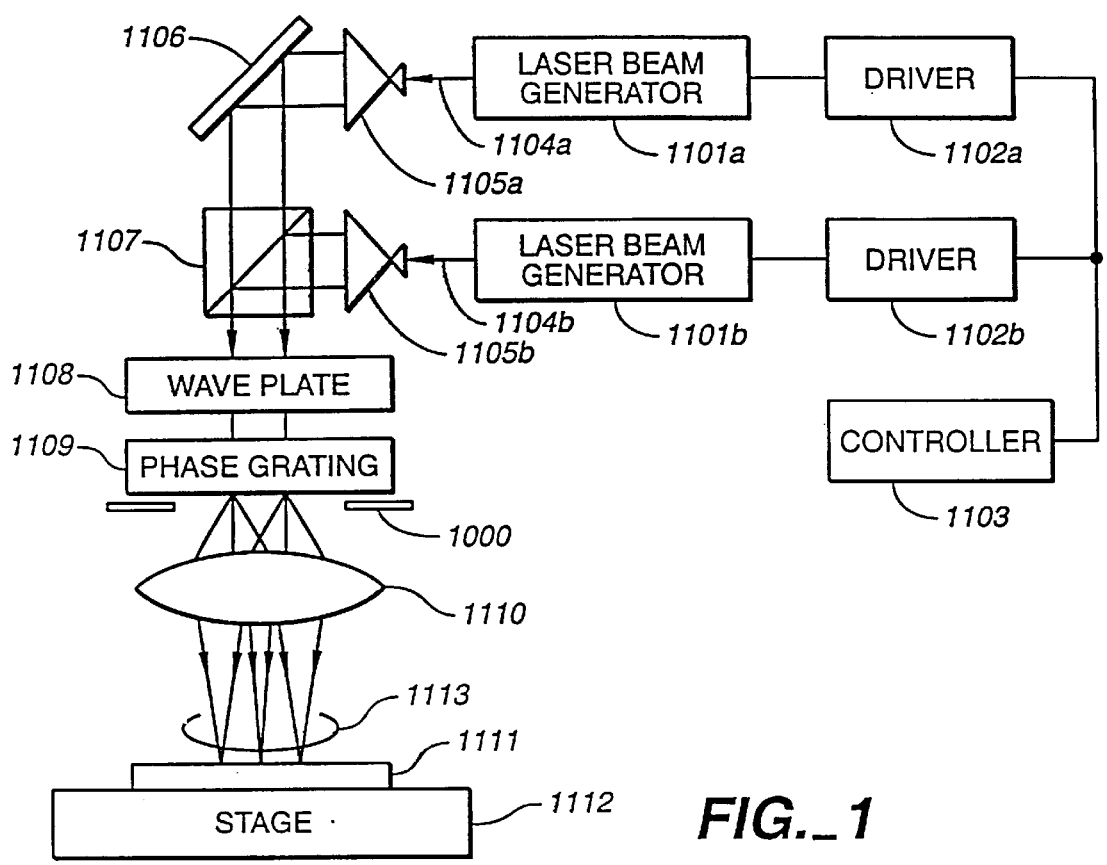
FIG._1
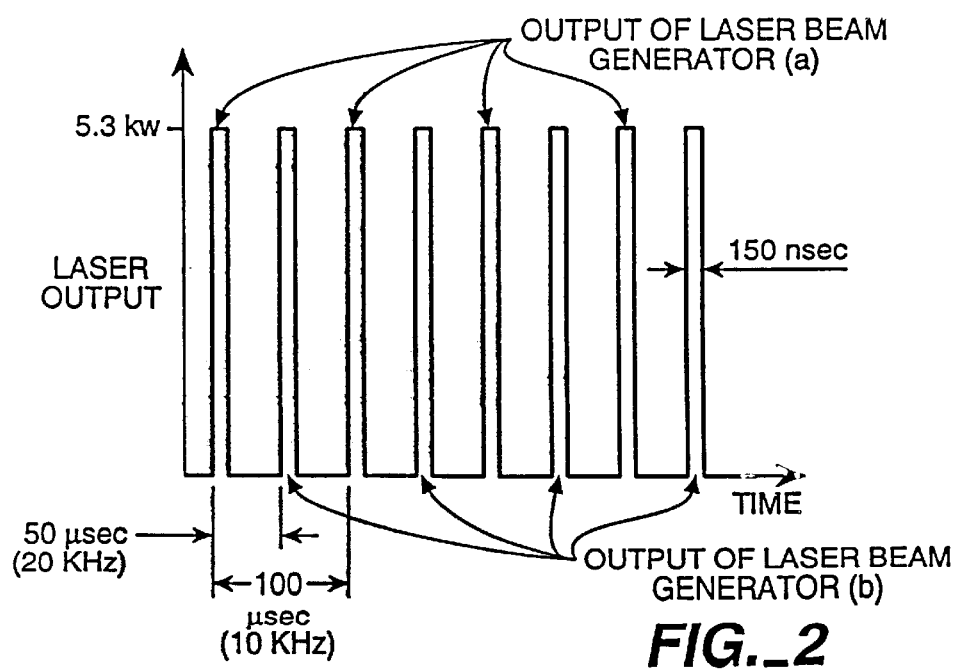
FIG._2

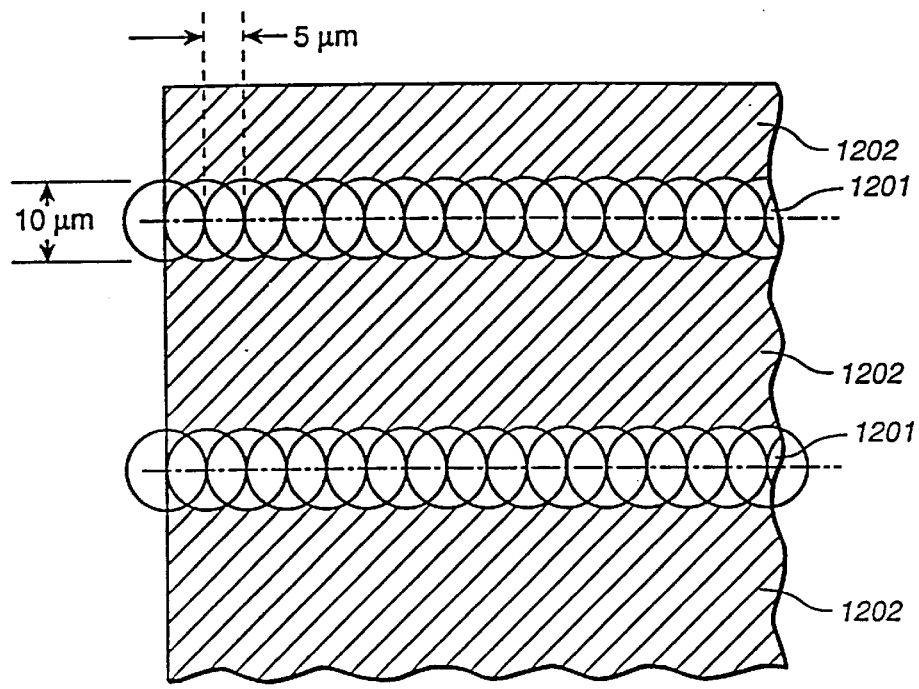
FIG._3
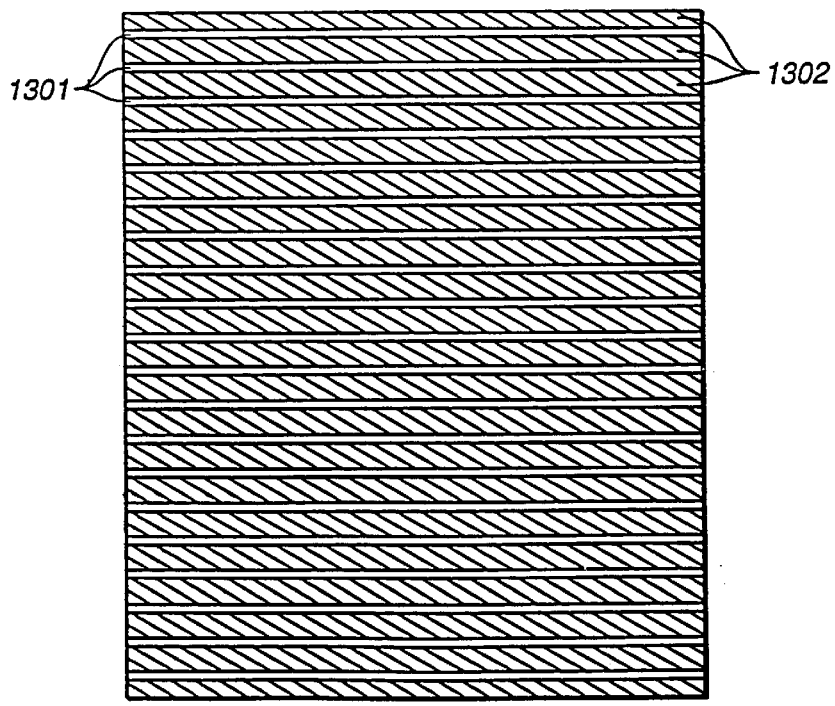
FIG._4

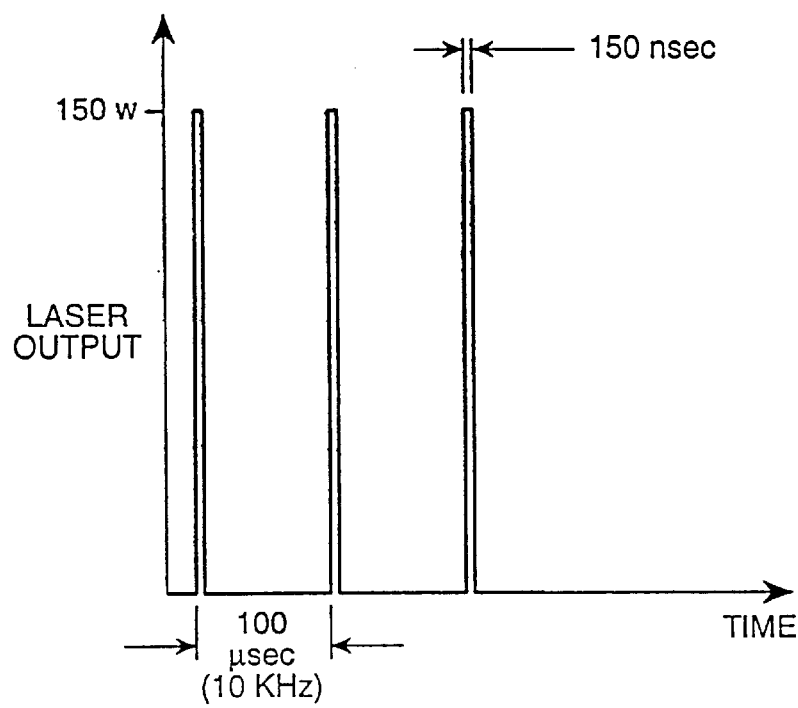
FIG._5a
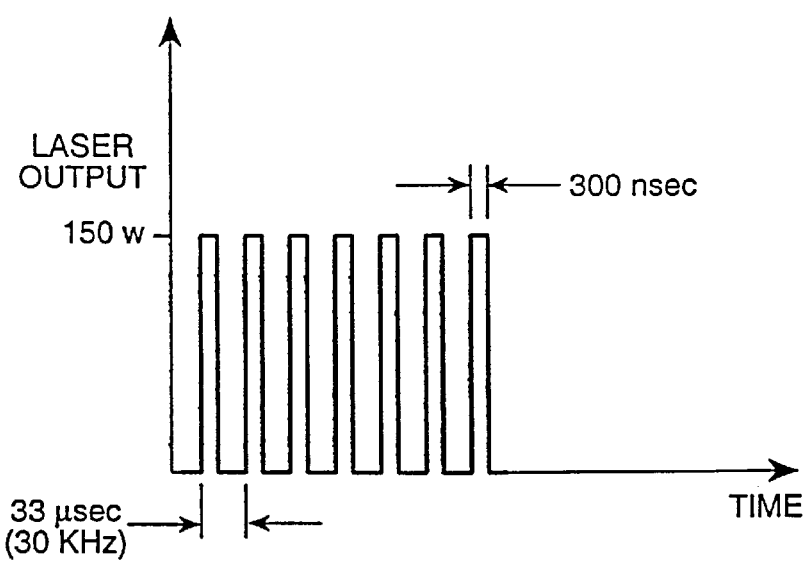
FIG._5b

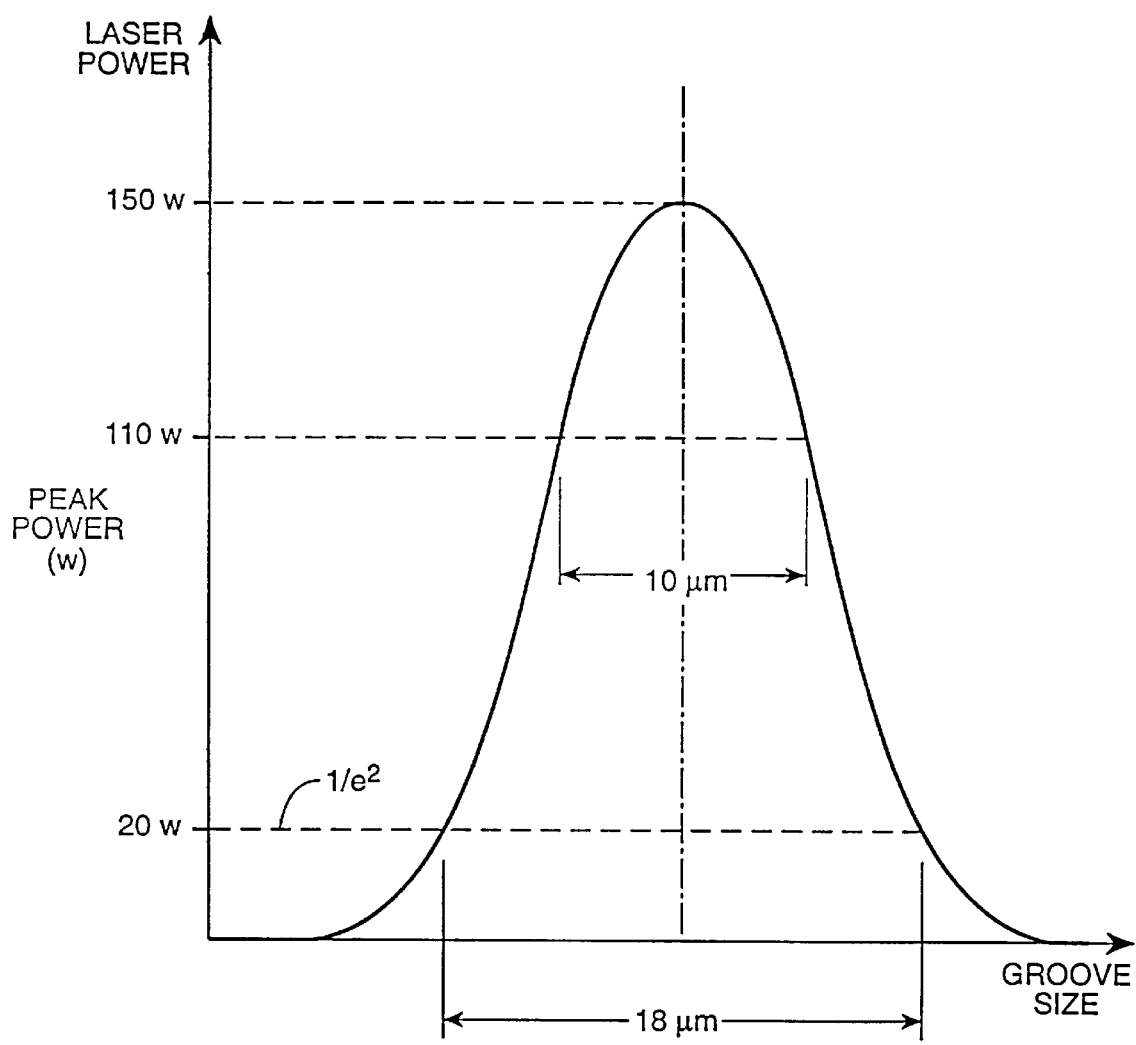
FIG._6

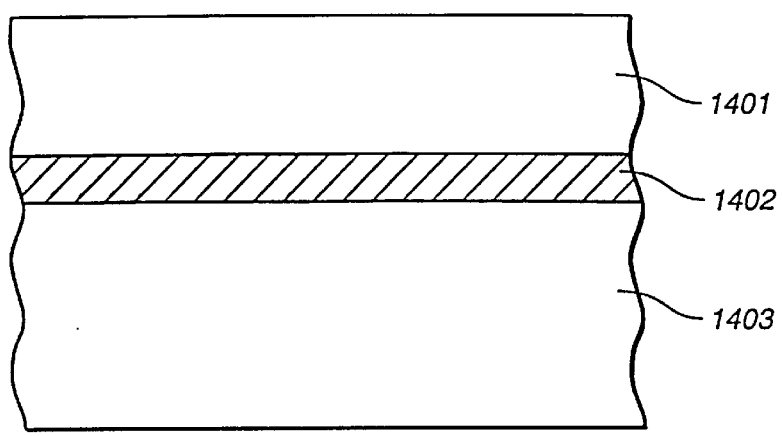
FIG._7
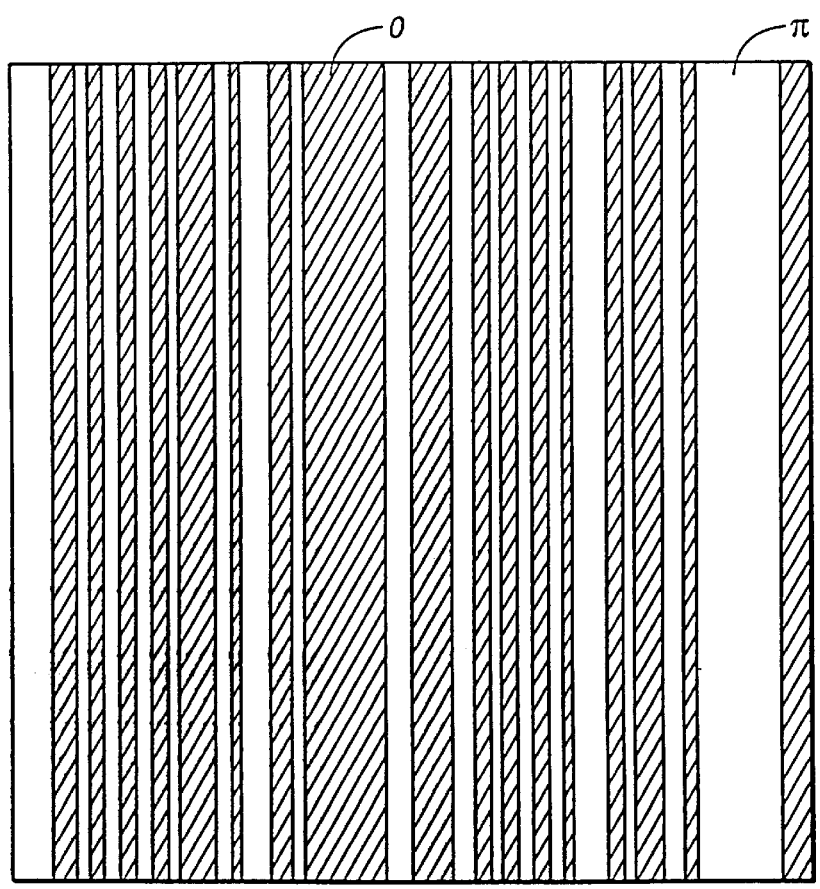
FIG._8

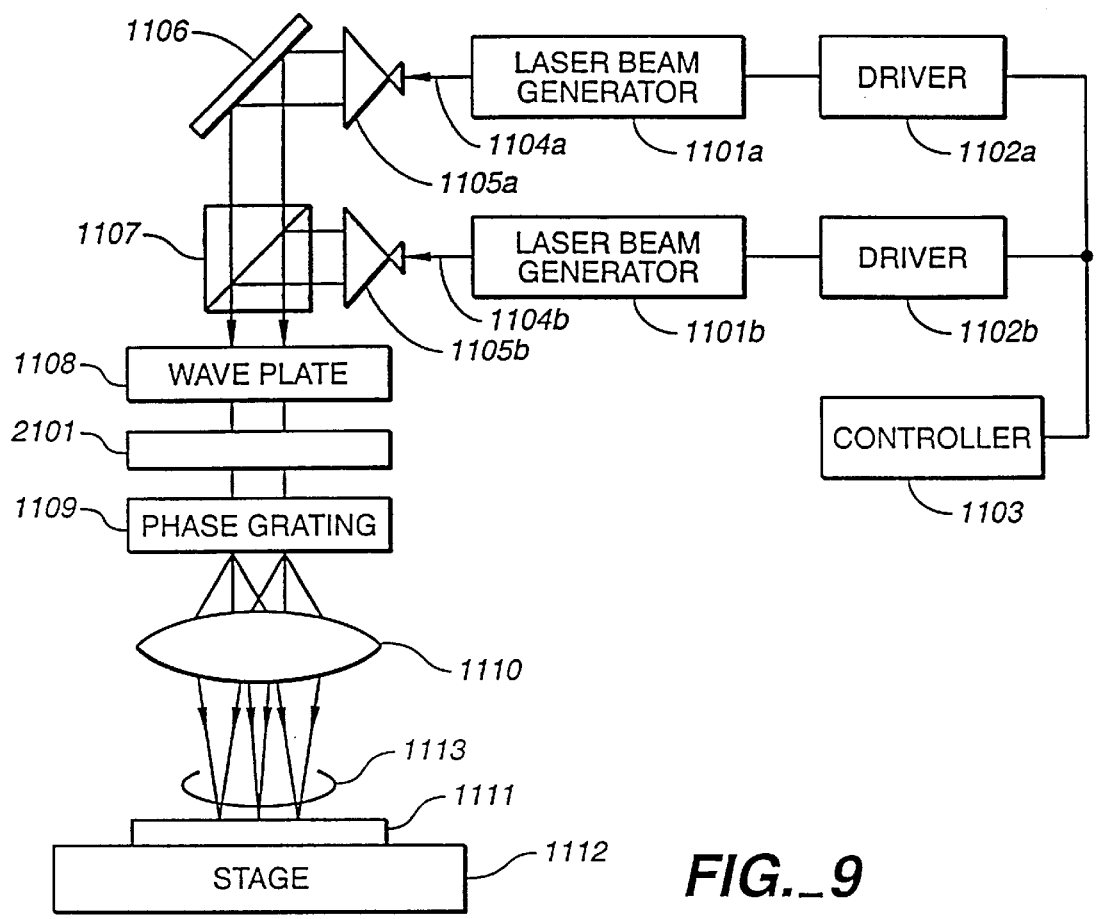
FIG._9
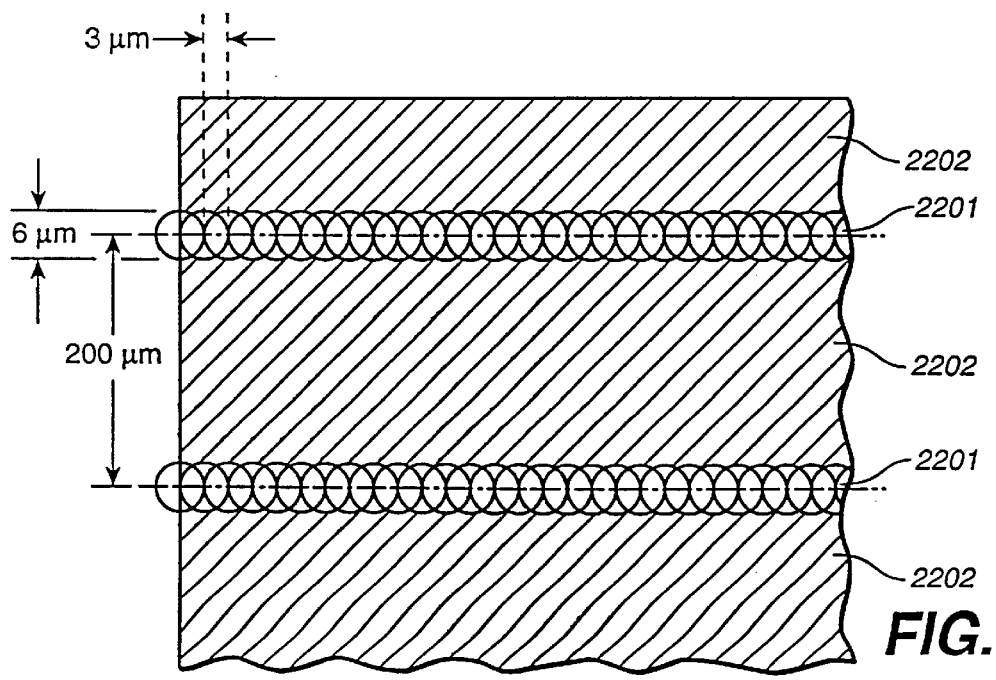
FIG._10

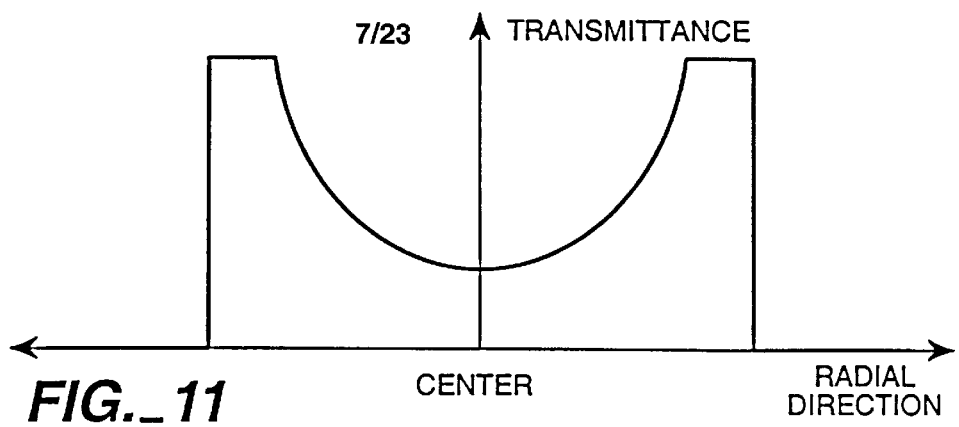
FIG._11
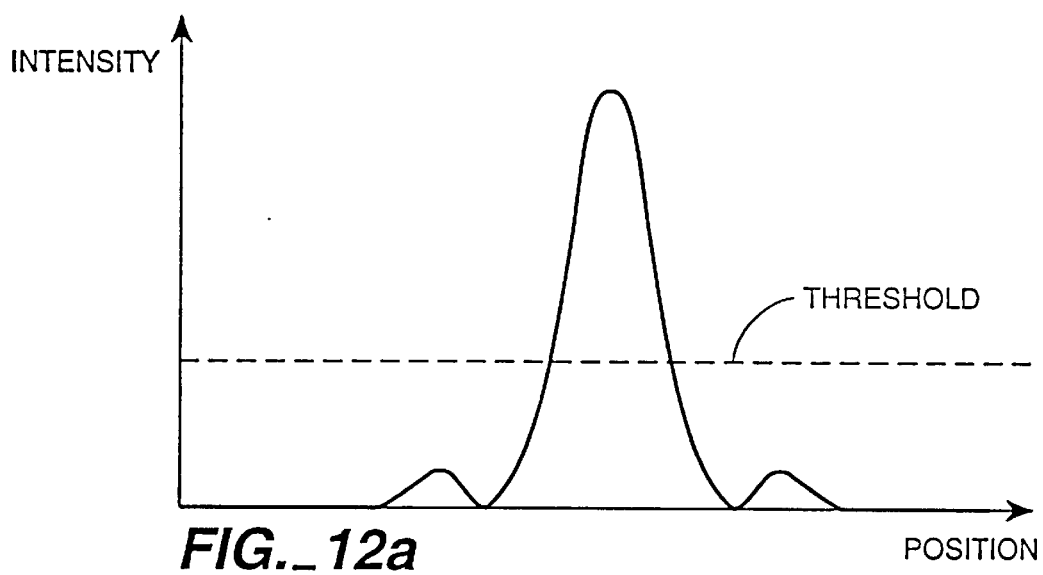
FIG._12a
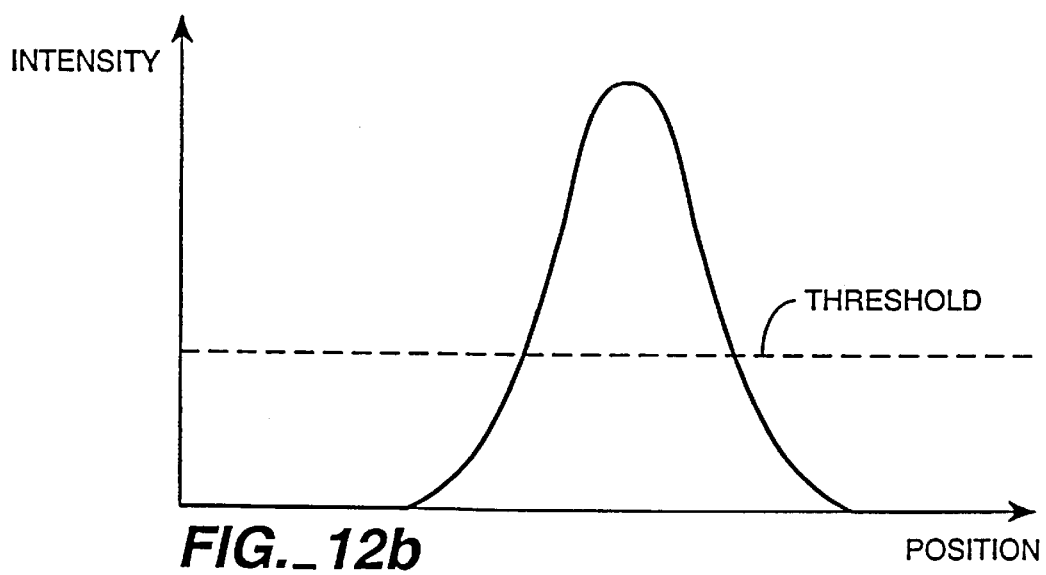
FIG._12b

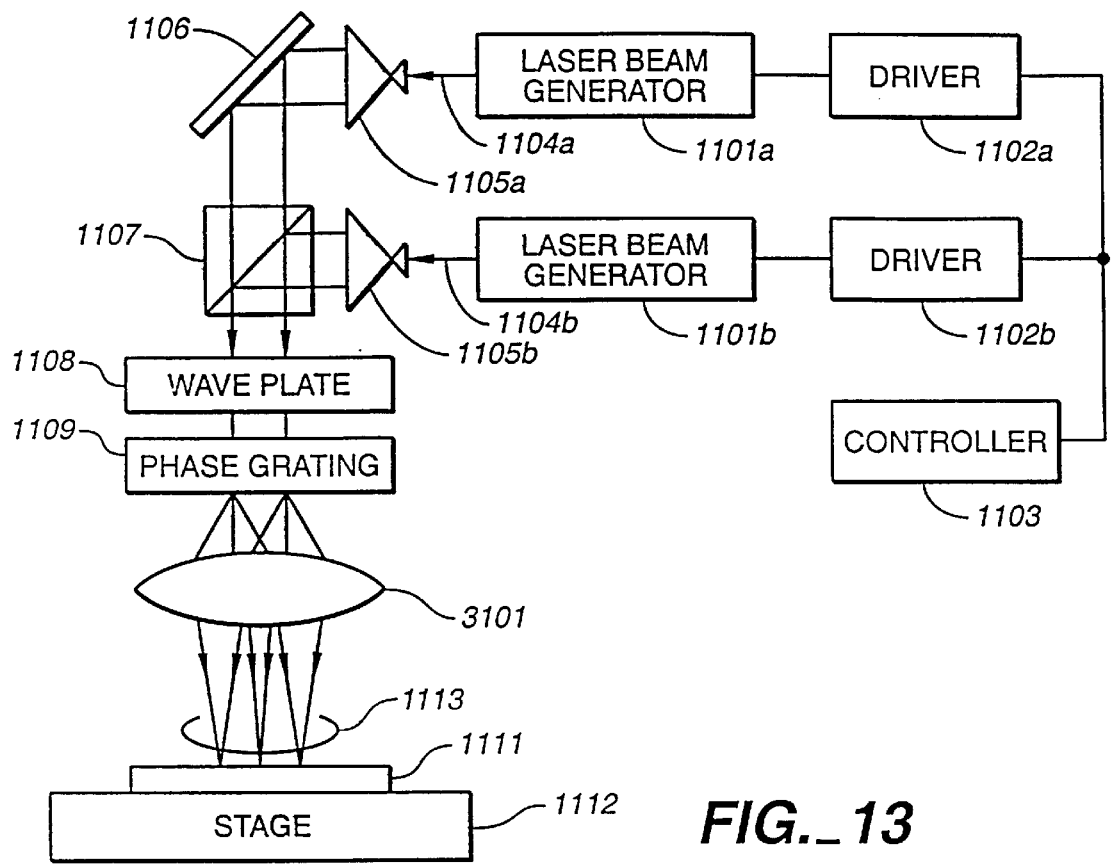
*FIG._13*
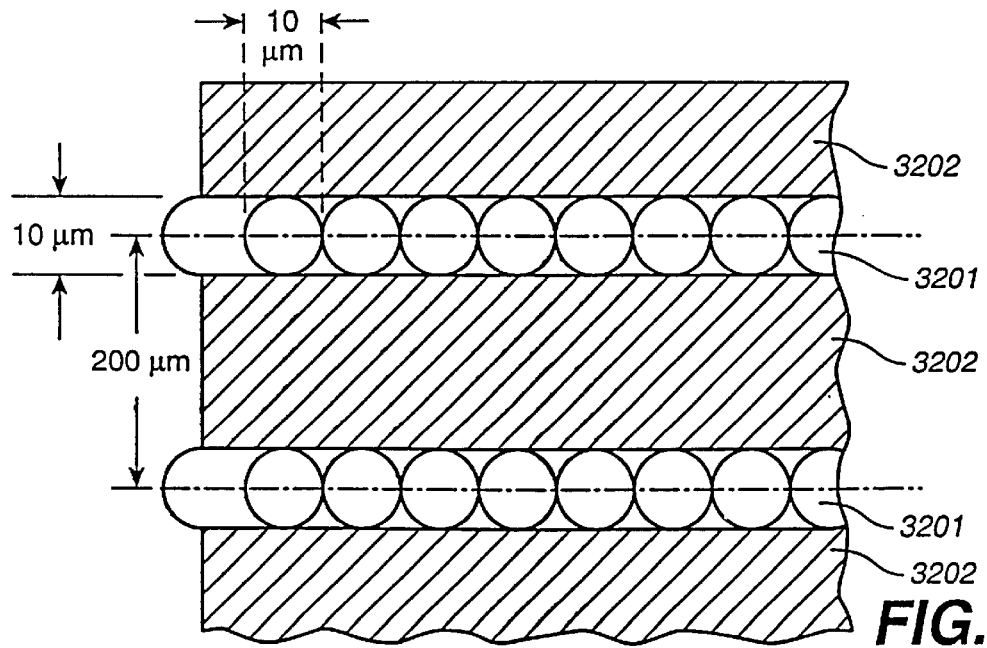
*FIG._14*

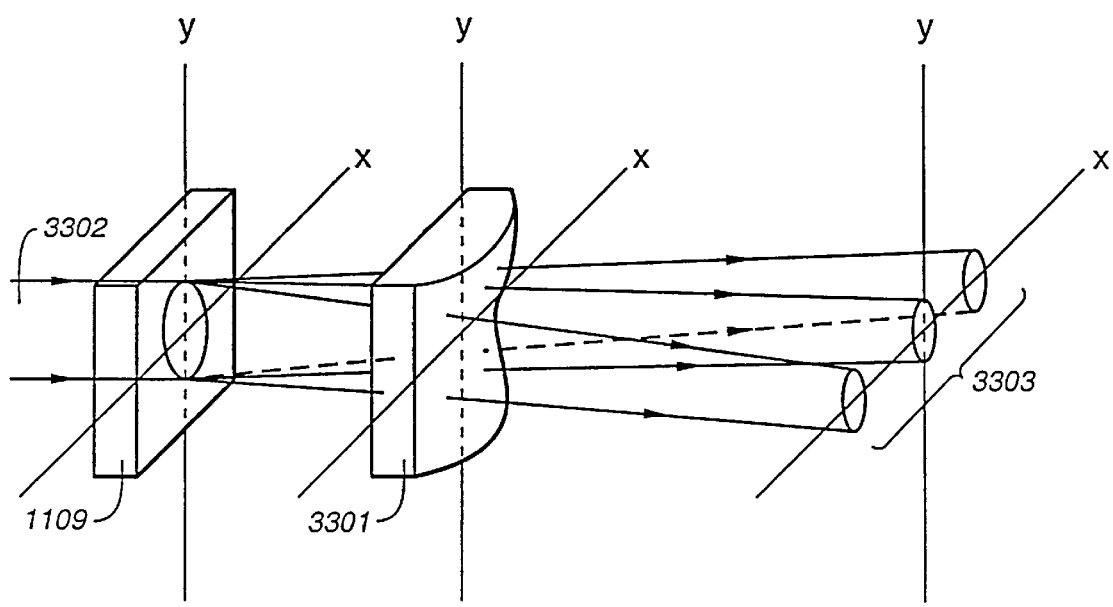
FIG._15a
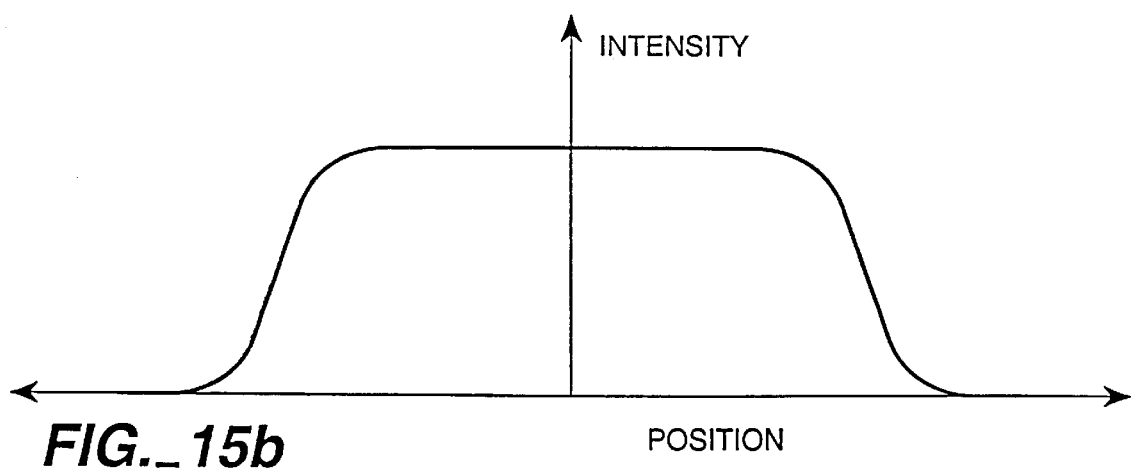
FIG._15b

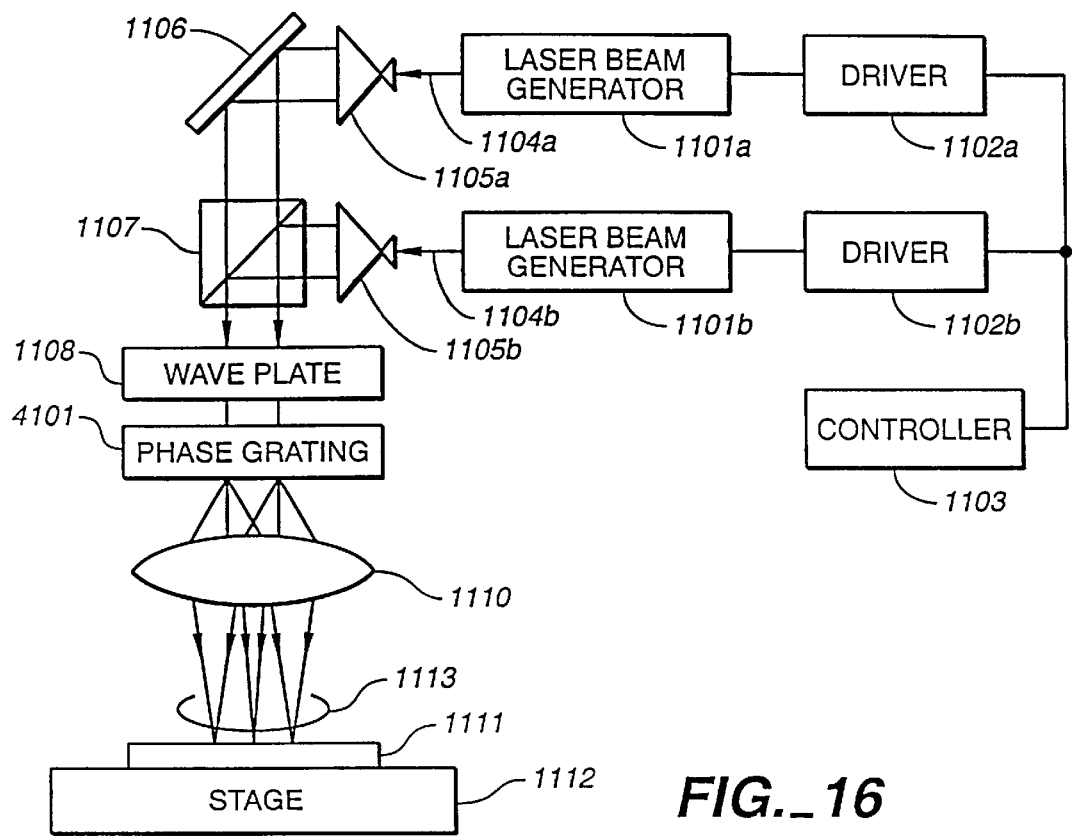
FIG._16
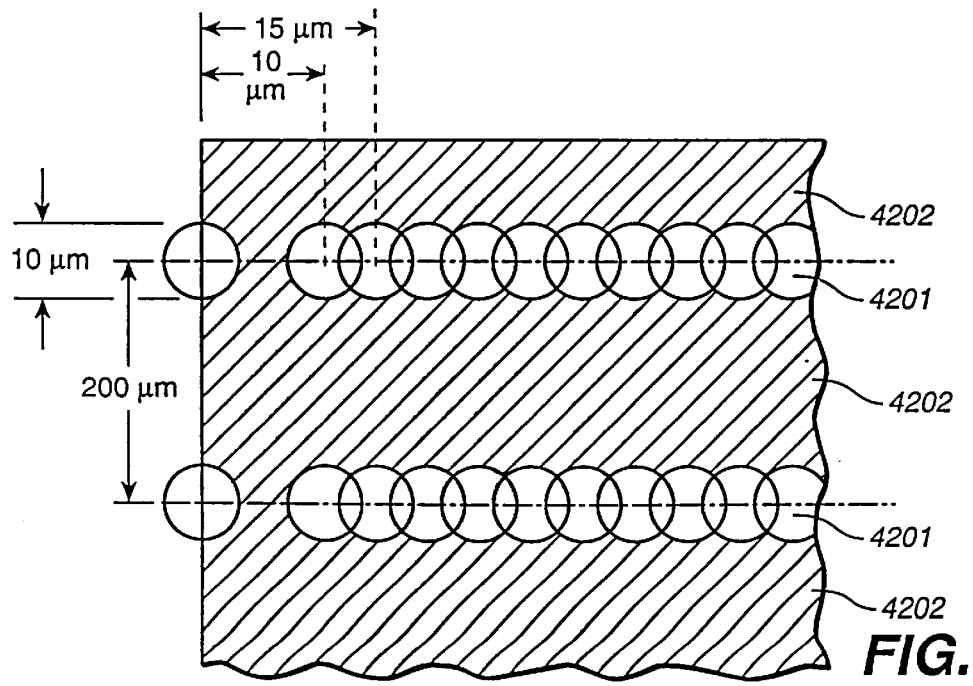
FIG._17

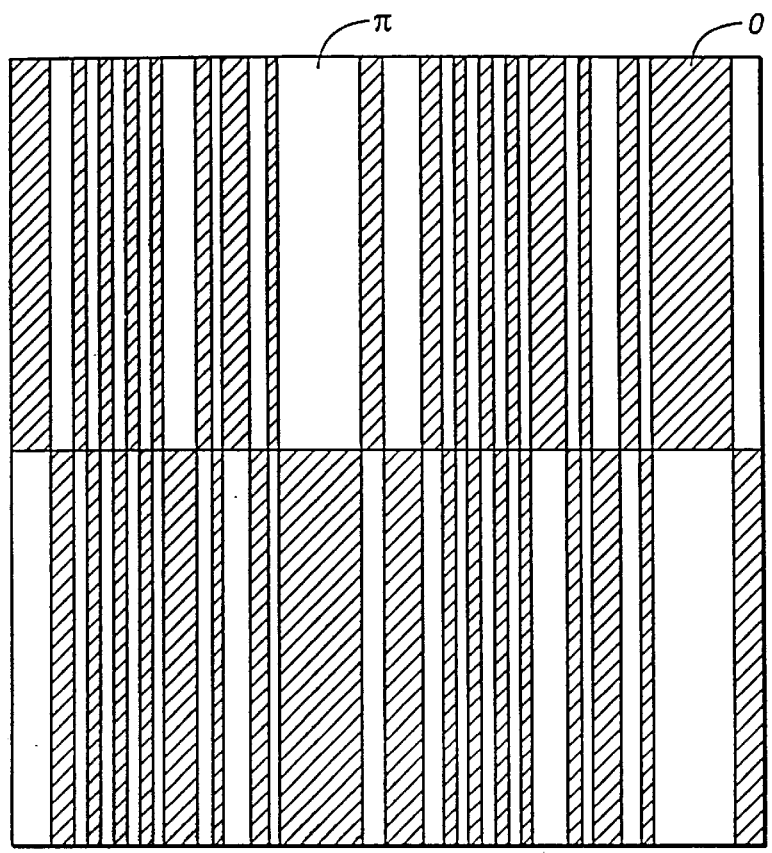
FIG._18
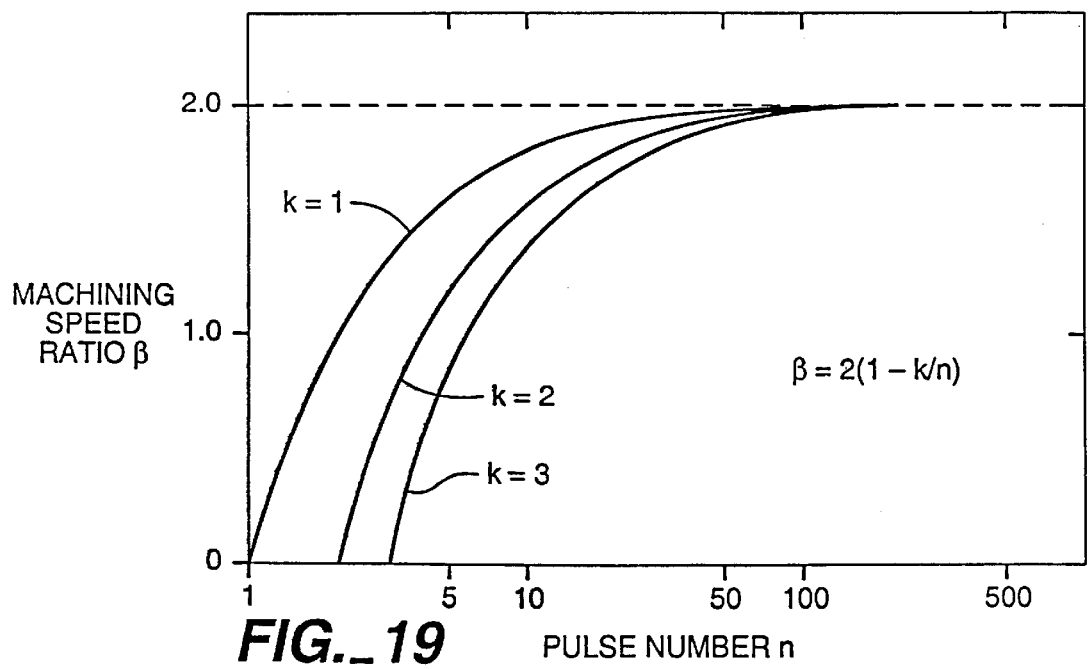
FIG._19

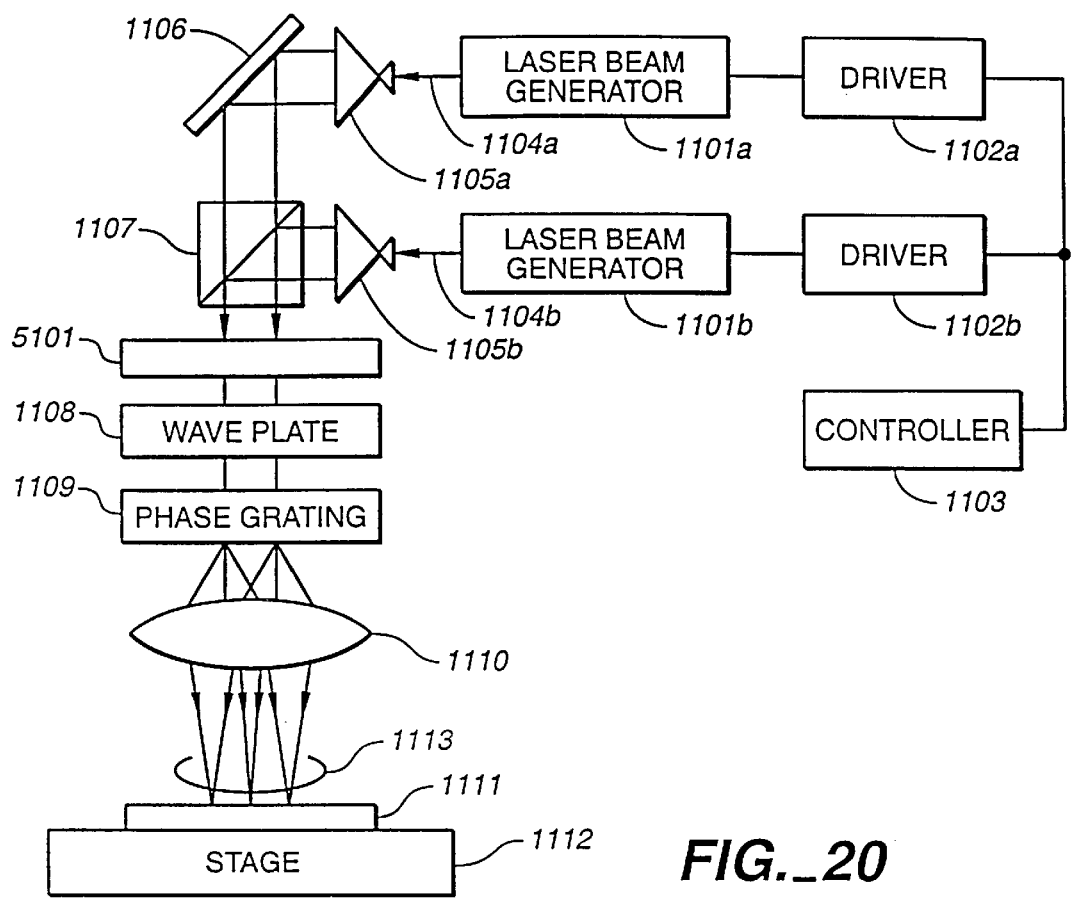
FIG._20
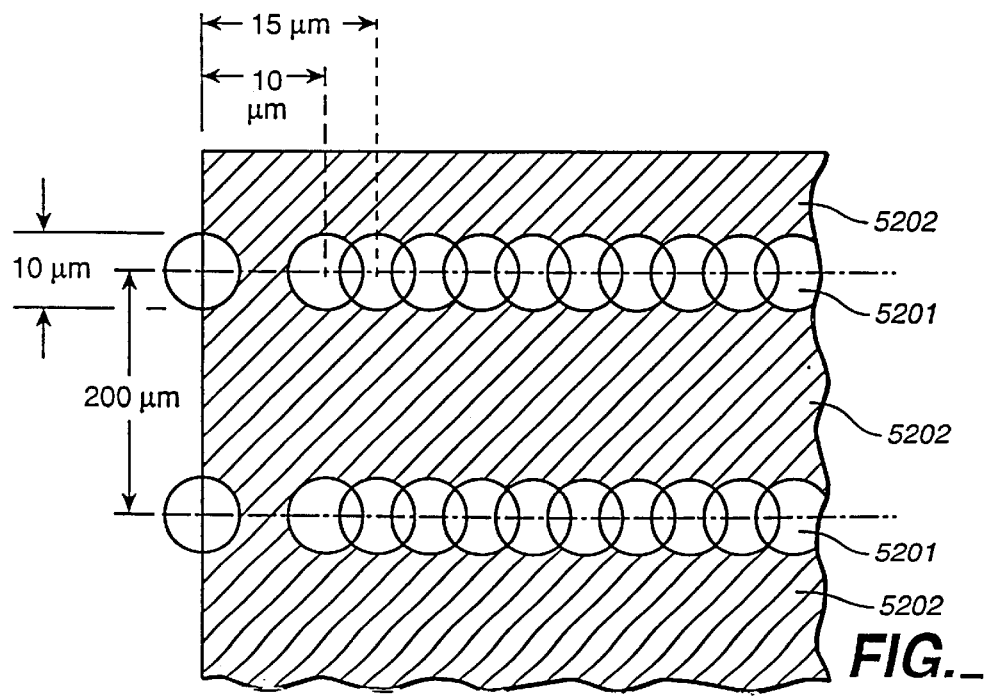
FIG._21

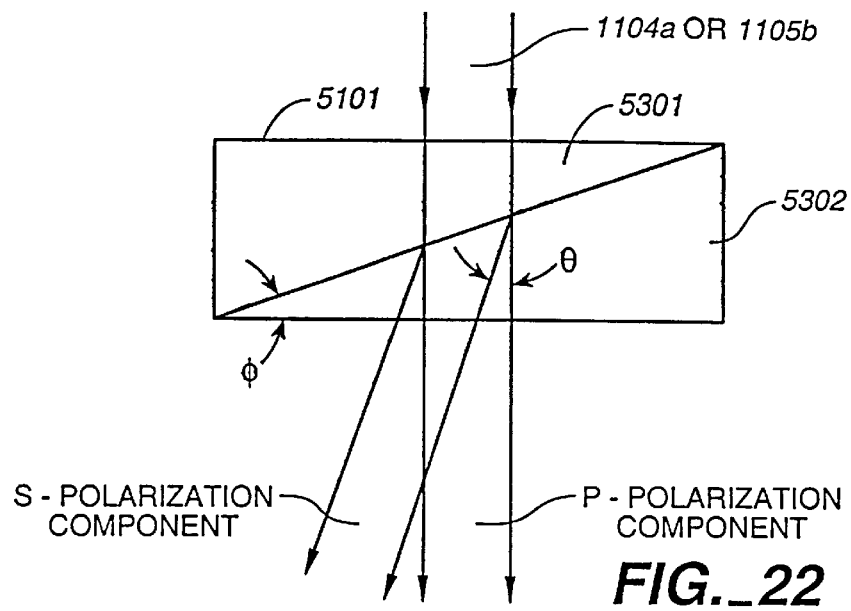
FIG._22
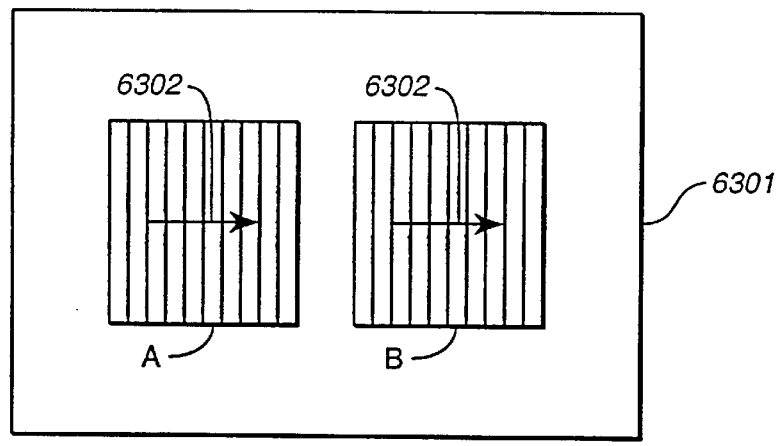
FIG._25a
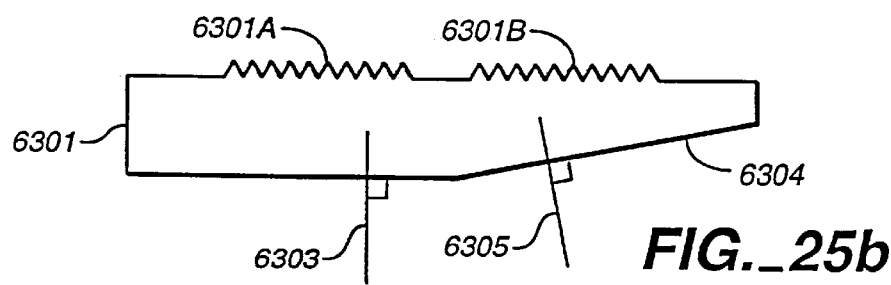
FIG._25b

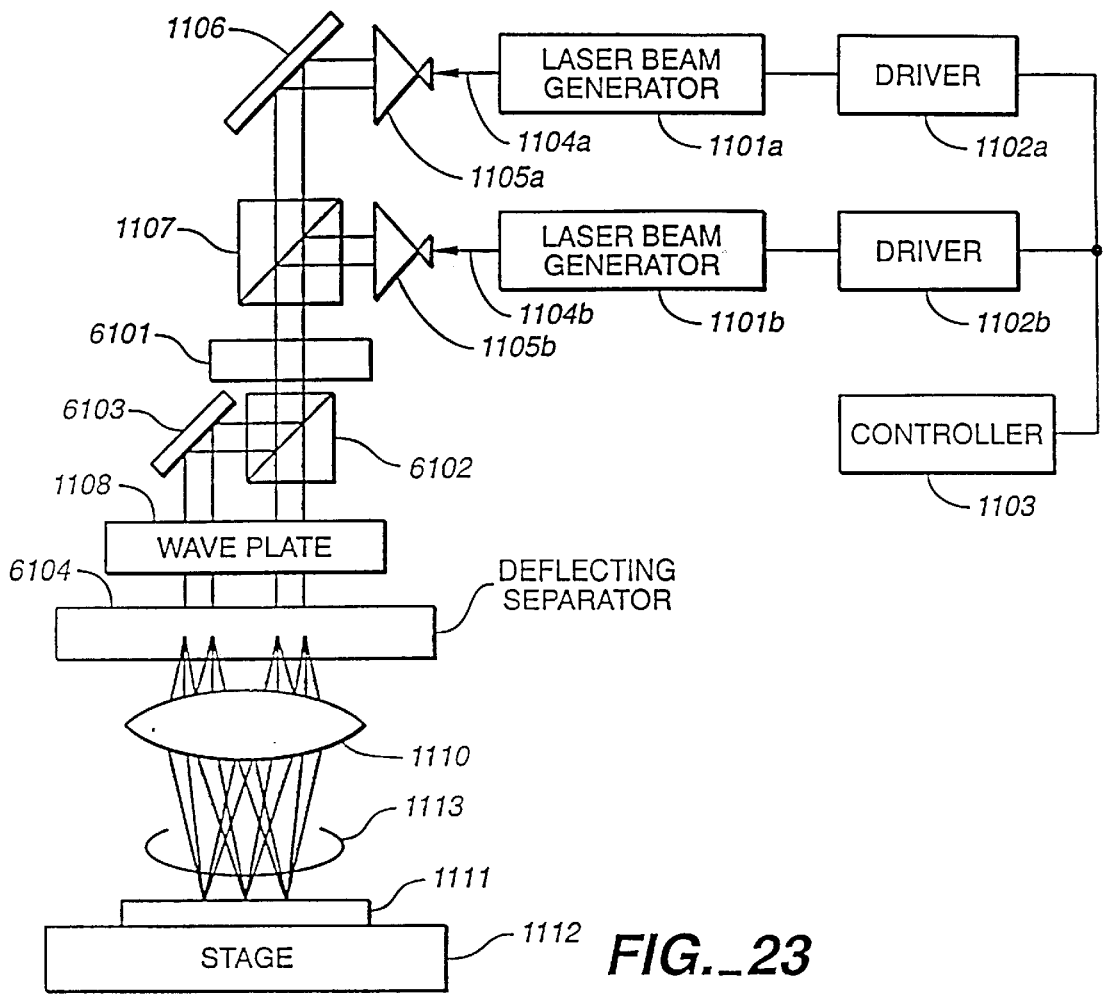
*FIG._23*
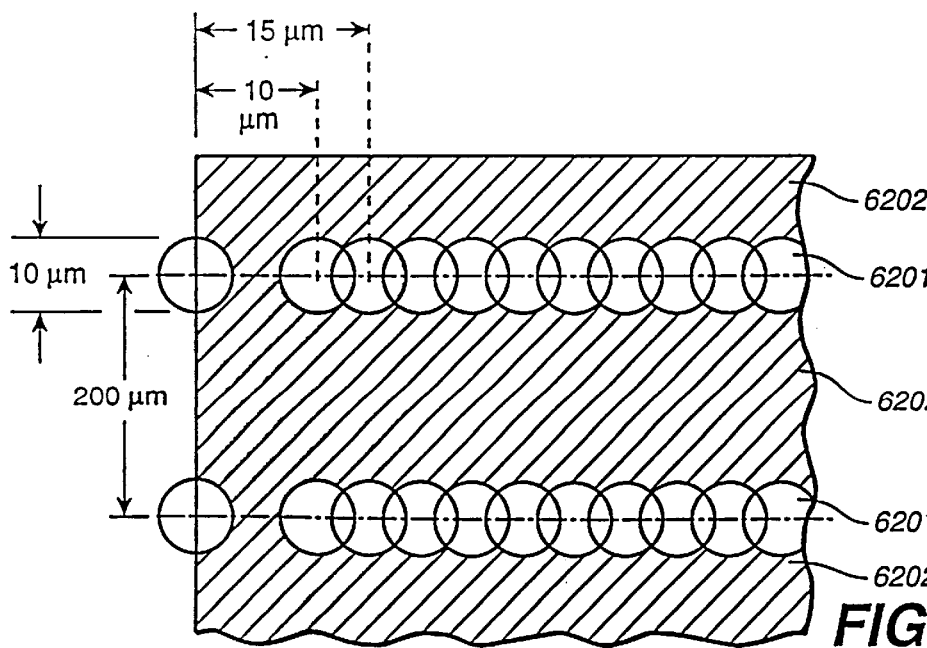
*FIG._24*

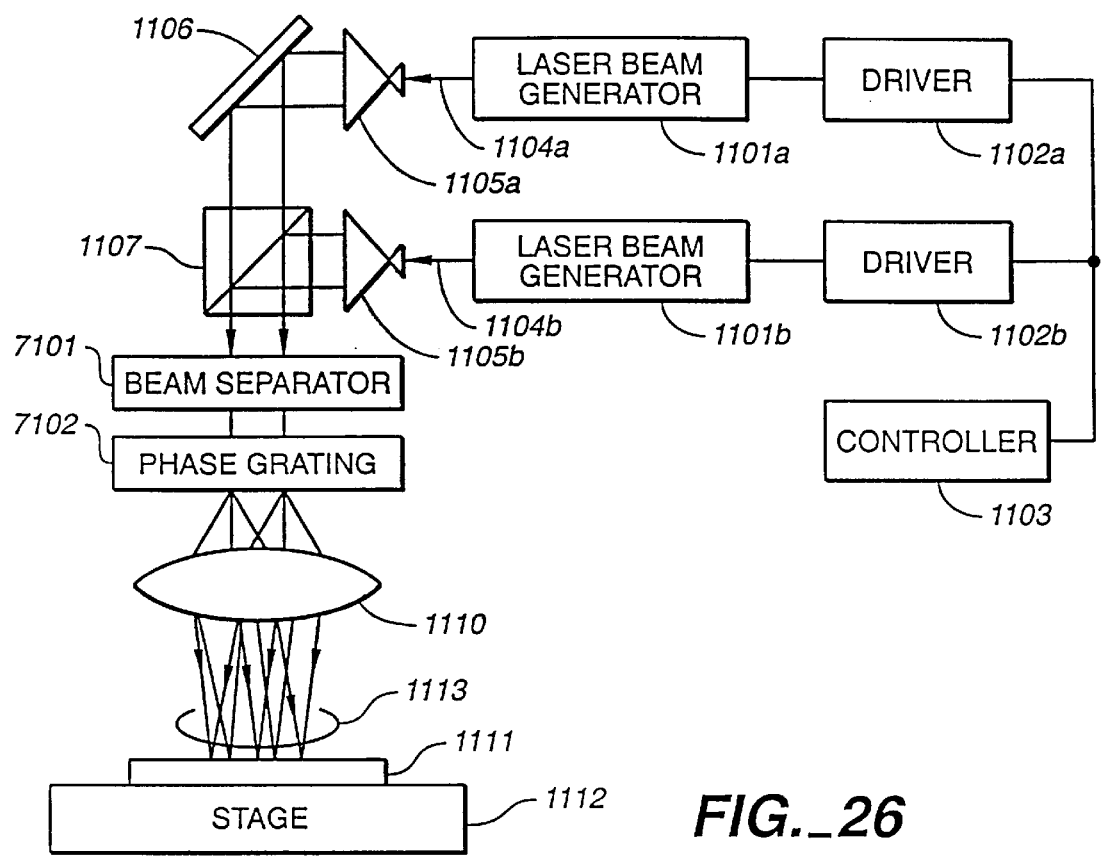
FIG._26
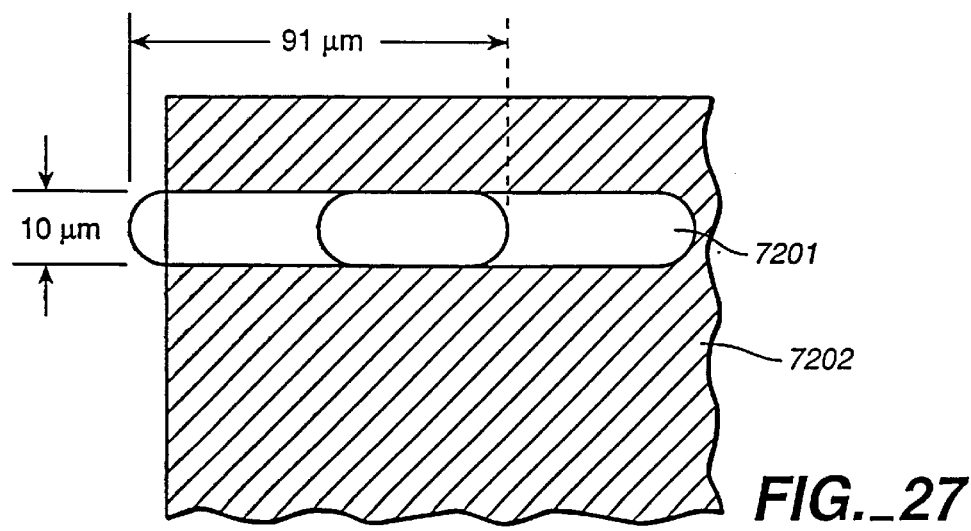
FIG._27

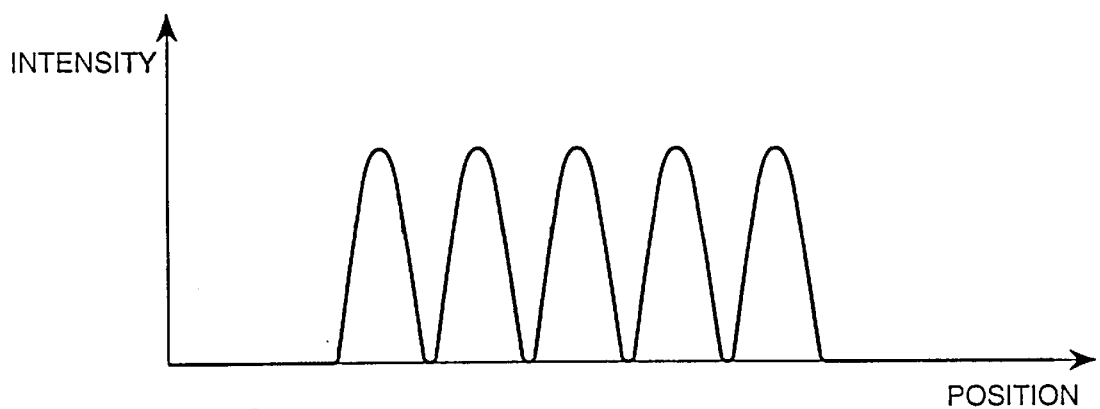
FIG._28a
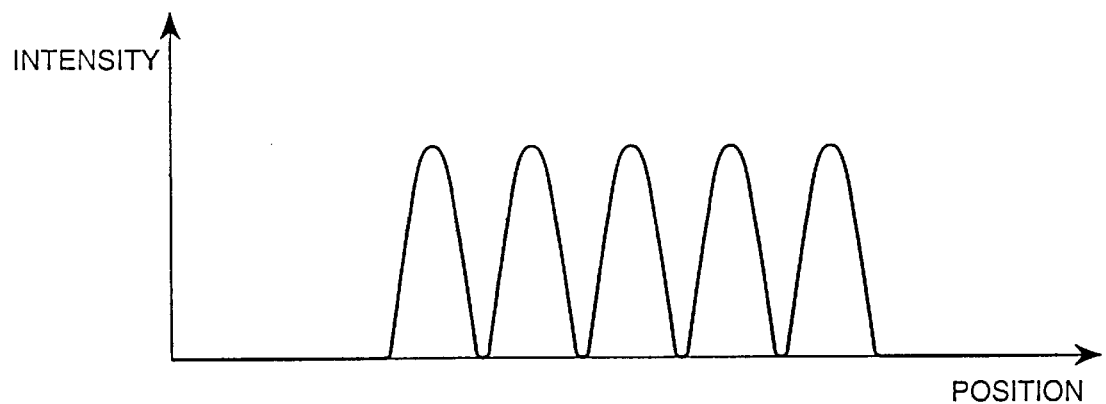
FIG._28b
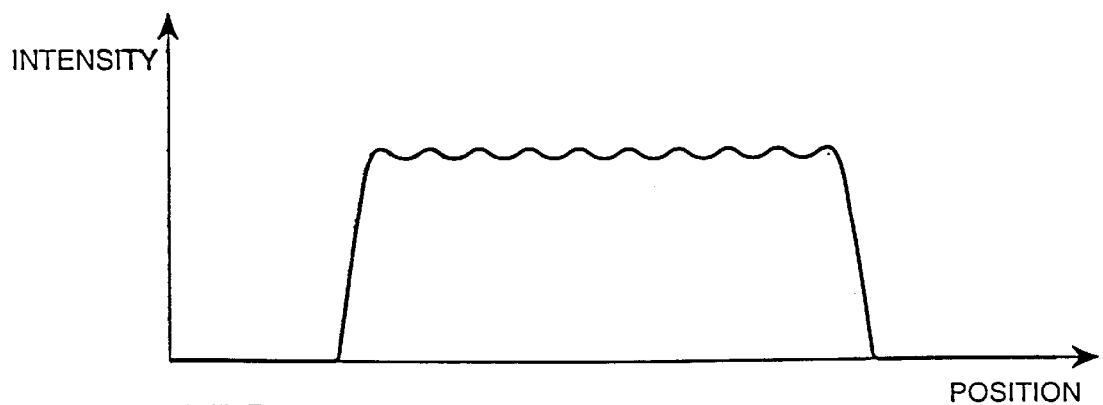
FIG._28c

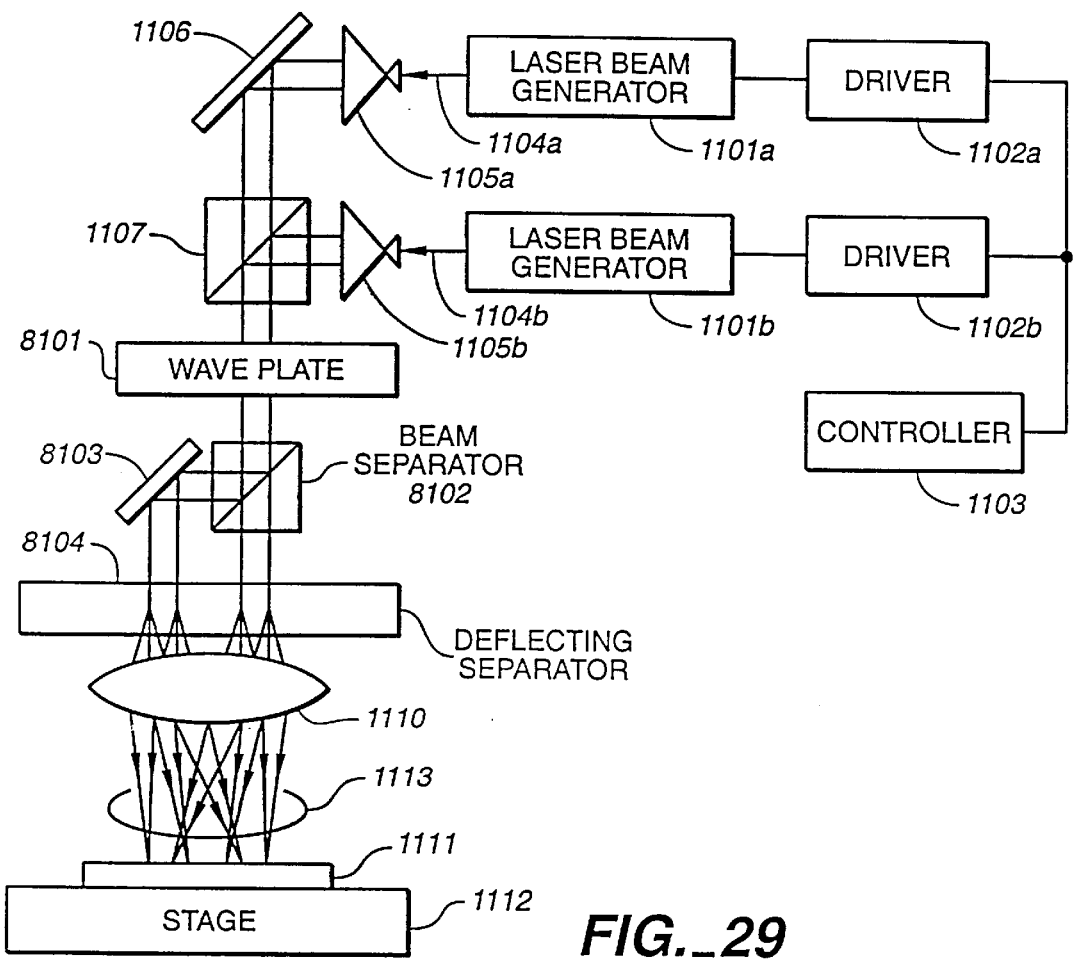
*FIG._29*
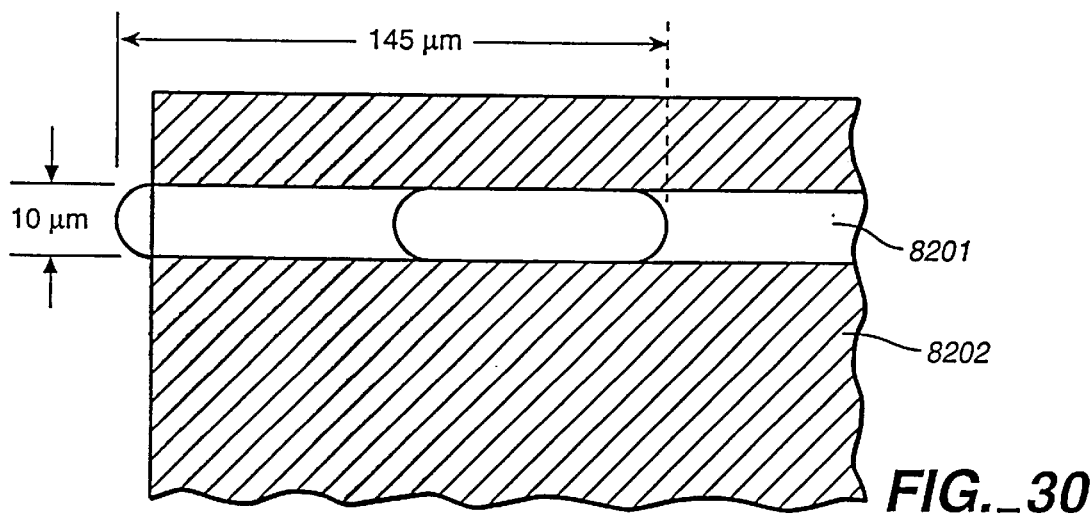
*FIG._30*

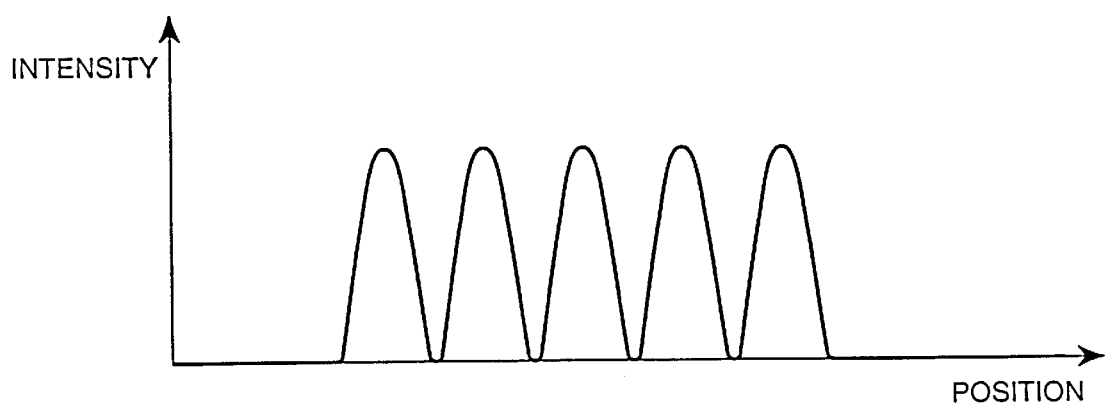
FIG._31a
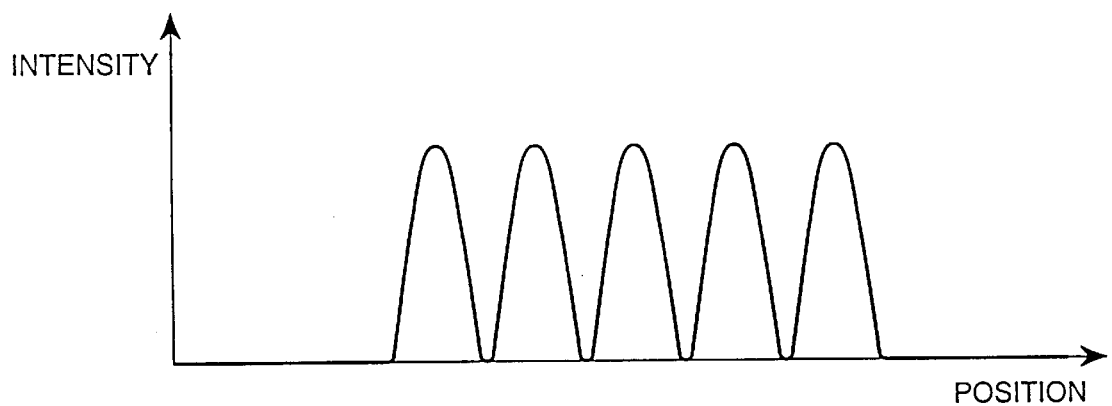
FIG._31b
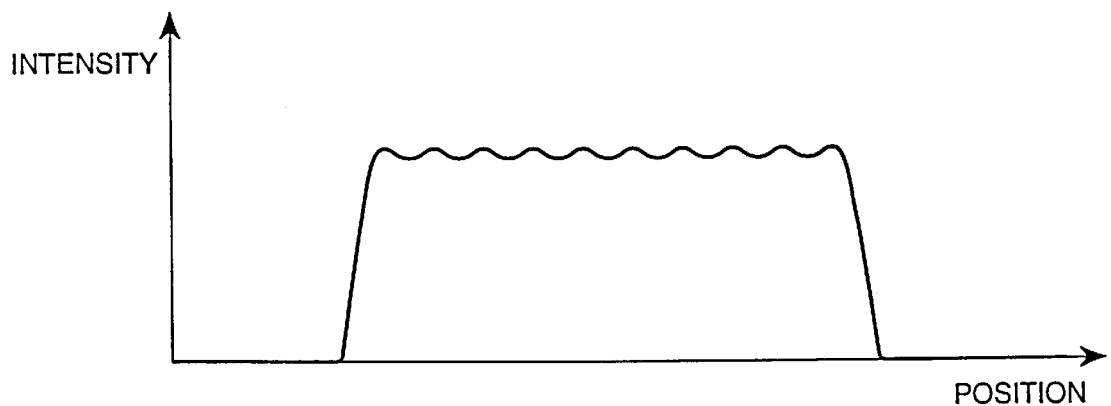
FIG._31c

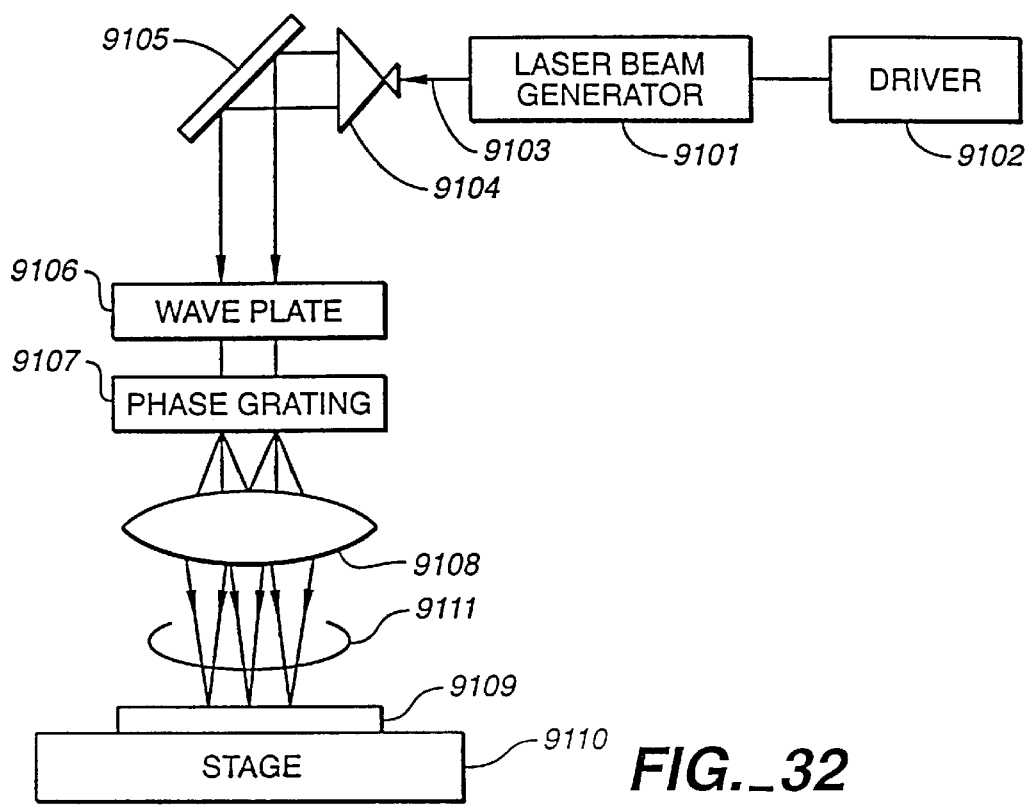
FIG._32
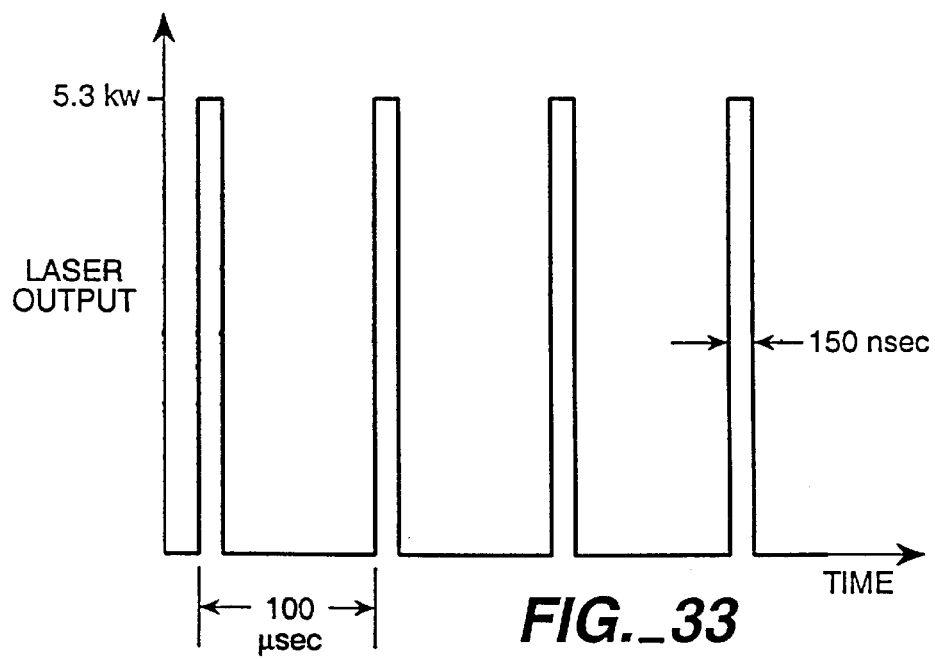
FIG._33

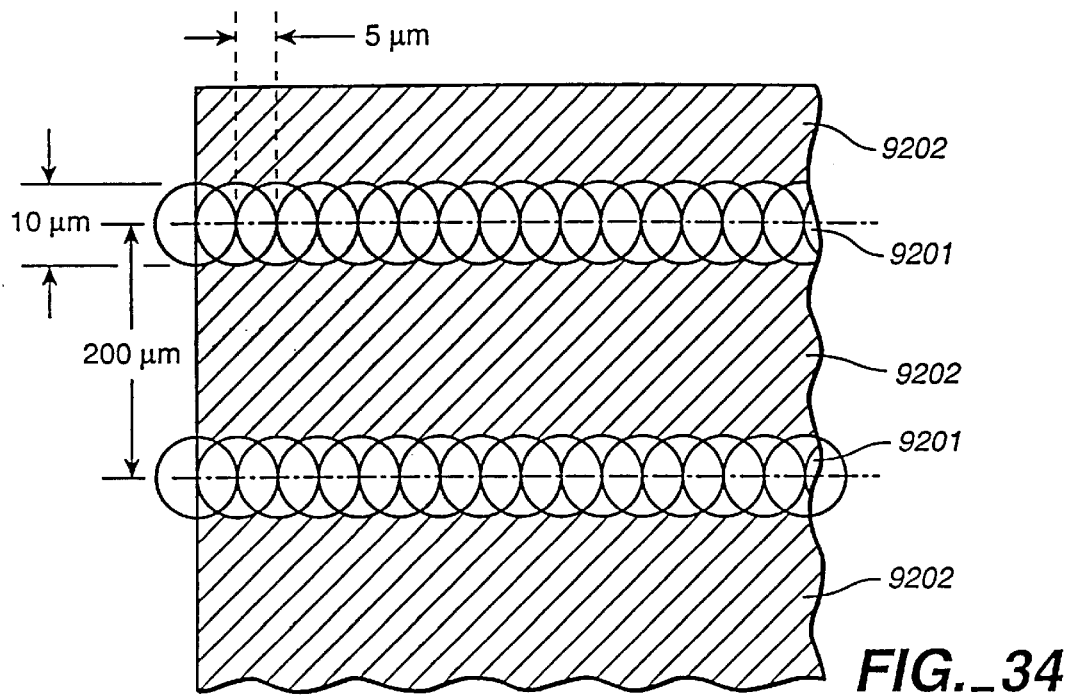
FIG._34
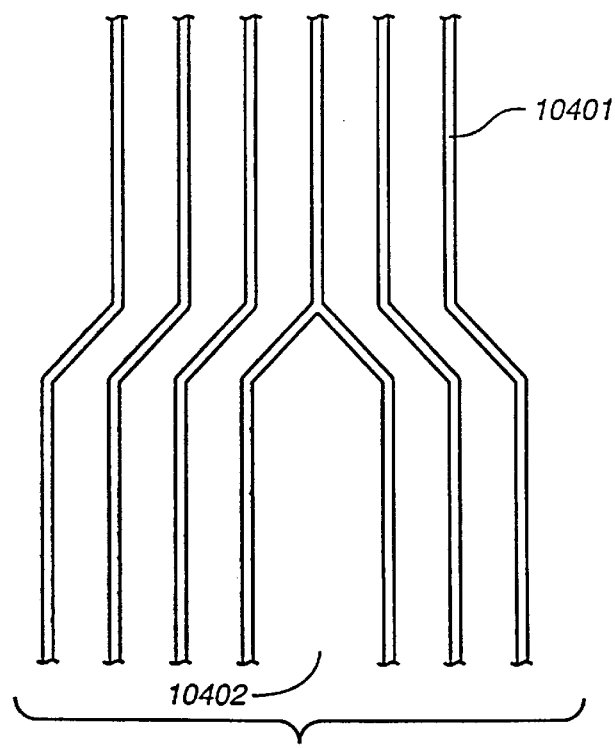
FIG._36

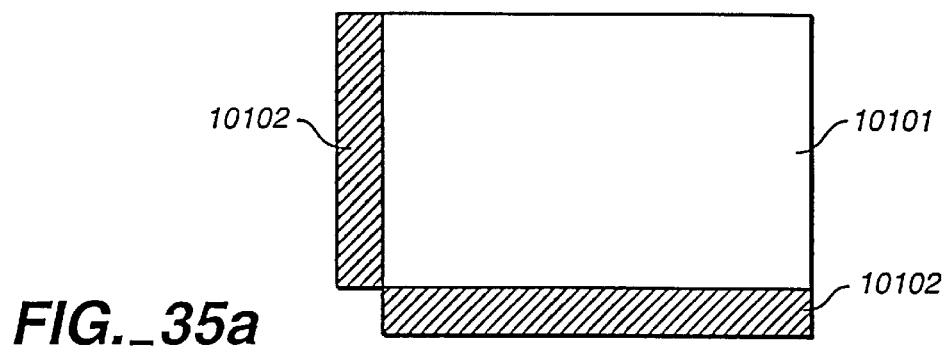
FIG._35a
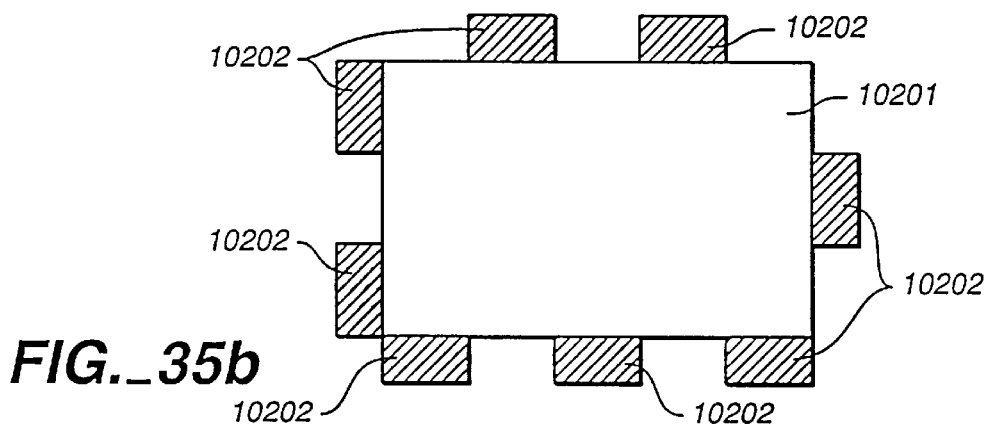
FIG._35b
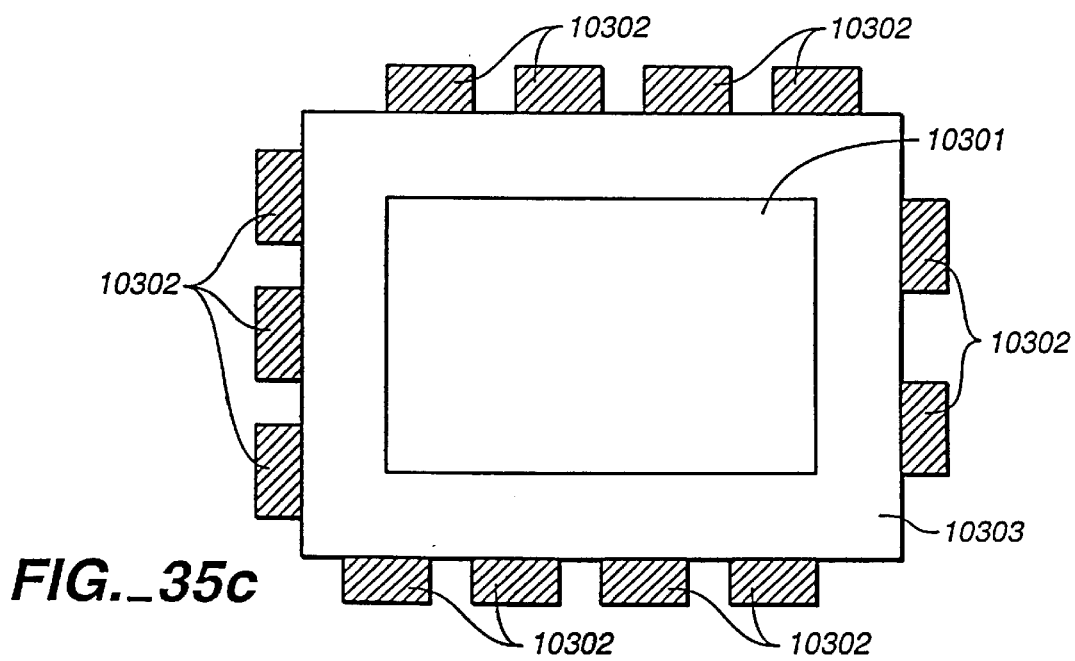
FIG._35c

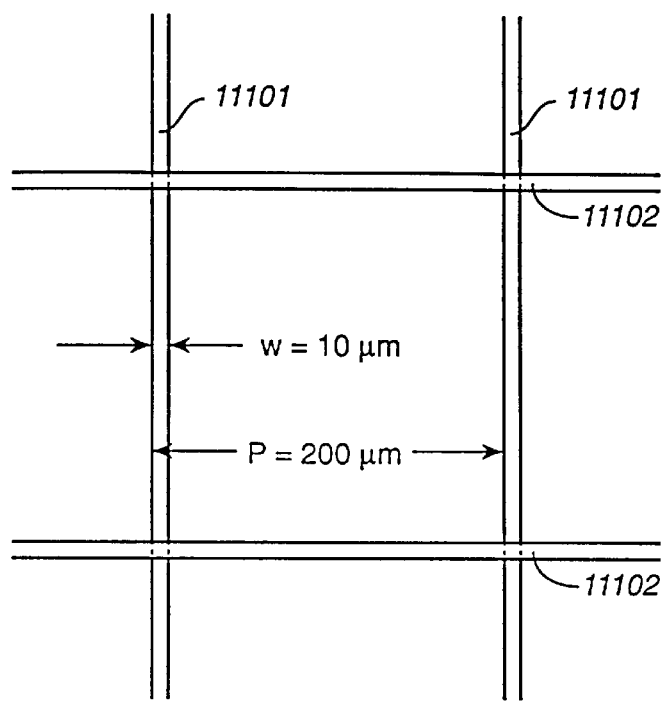
FIG._37a
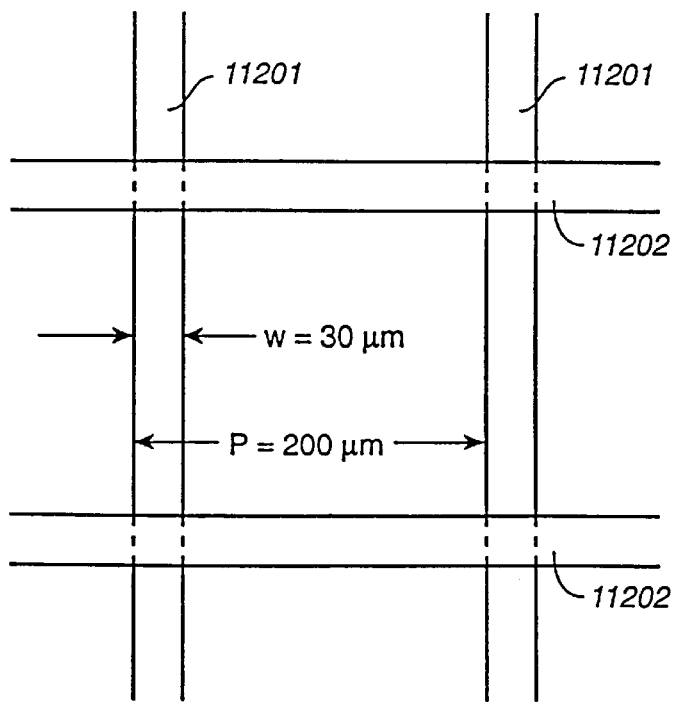
FIG._37b
(PRIOR ART)

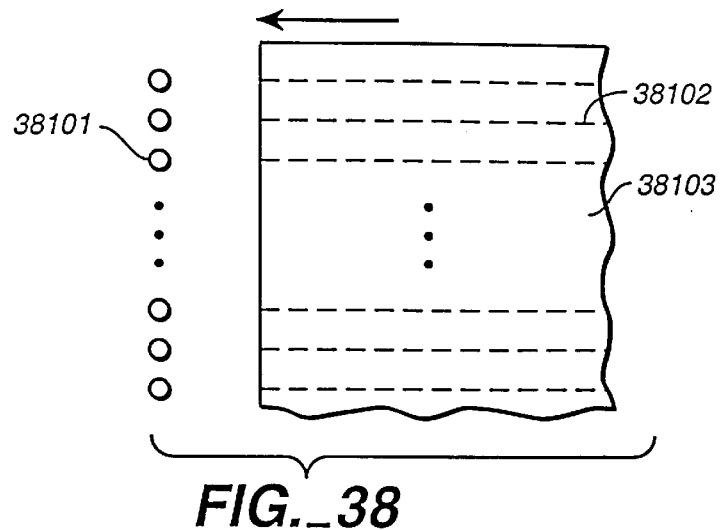
FIG._38
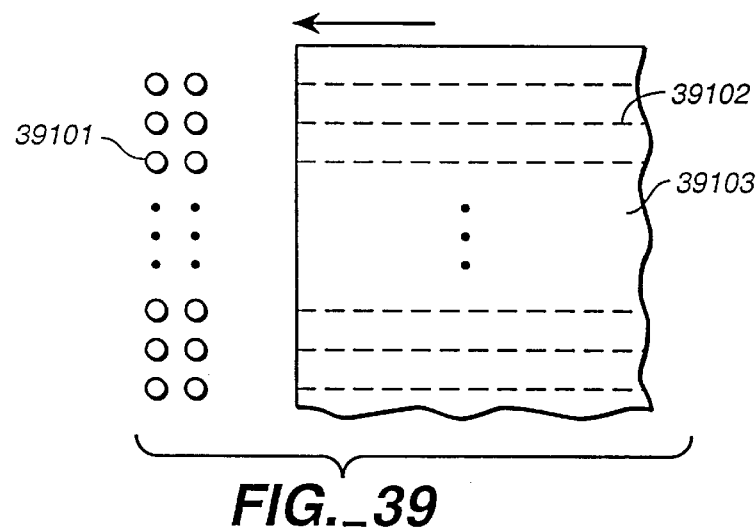
FIG._39
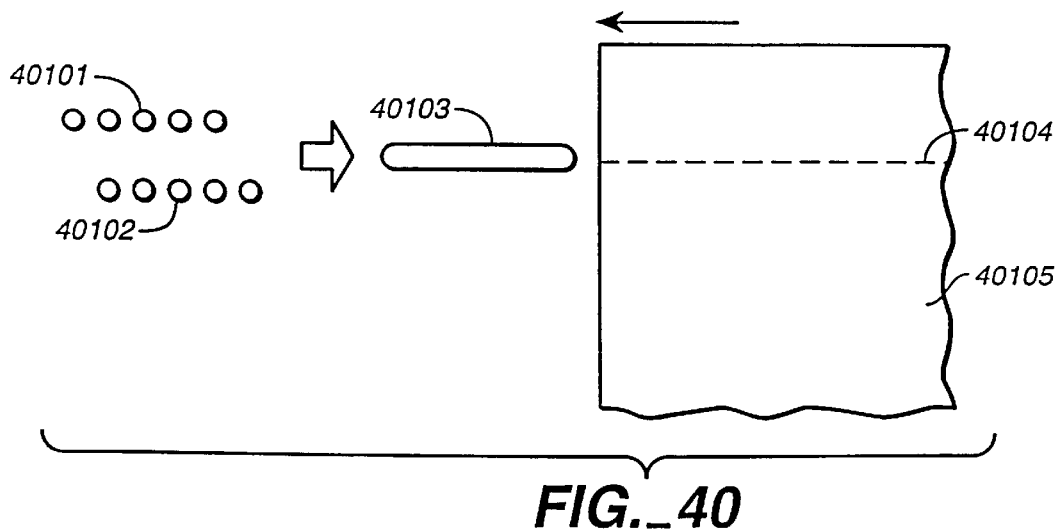
FIG._40

LASER MACHINING METHOD FOR PRECISION MACHINING

CROSS REFERENCE TO RELATED APPLICATION

This application is a continuation of U.S. patent application Ser. No. 09/321,802 filed May 27, 1999, now U.S. Pat. No. 6,376,799, which is a division of U.S. patent application Ser. No. 08/890,128, filed July 9, 1997, now U.S. Pat. No. 6,031,201, issued Feb. 29, 2000, which is a continuation of U.S. patent application Ser. No. 08/385,932, filed Feb. 3, 1995, now abandoned, which is a continuation-in-part of International Application PCT/JP94/00912 filed Jun. 6, 1994. The disclosures of the above applications are incorporated herein by reference.

BACKGROUND OF THE INVENTION

1. Technical Field

The present invention relates to a laser machining apparatus that can provide high precision machining of fine patterns and that is suitable for use in mass production, and to a laser machining method therewith. The present invention also relates to a high quality liquid crystal display panel having an electrode structure that is patterned by this laser machining method.

2. Background Art

There are various types of known laser machining apparatus. These include a $CO_2$ laser apparatus that is a popular technique to cut or bore a metal plate, and a YAG laser apparatus that is broadly used to perform high precision machining of a thin metal sheet. In particular, the YAG laser apparatus is a useful tool for various kinds of high precision machining owing to its small size, easy maintenance, and high performance that can readily provide a laser beam focused into a spot with a diameter of a few tenths of a micron. Another advantage of the YAG laser is that the second harmonic wave(at a wavelength of 532 nm) is available to perform precision machining on a thin film using the ablation effect. The "ablation" means here an effect that when a macromolecular material is illuminated with a short-pulse laser beam with a short wavelength such as an eximer laser or YAG harmonic laser, the illuminated portion is instantaneously decomposed, vaporized, and scattered, whereby the portion illuminated with the laser beam is removed. In fact, Q-switched YAG lasers are used in various applications such as correction of defects of a semiconductor production mask, patterning of detecting portions of a thin film sensor, patterning of electrodes of a liquid crystal display panel, etc. The Q-switched laser is preferably used in these application fields because it can provide a laser beam with a high peak power for a short pulse duration thereby performing high quality machining on a material to be machined without giving thermal damage. For further detailed information on the ablation machining technique, refer to "Application of a Short-Wavelength Short-Pulse Laser to Ablation Machining" (The Journal of the Institute of Precision Engineering, Vol.3, pp.473–478 (1993)).

One of important applications of thin film machining techniques is patterning of transparent electrodes of a liquid crystal panel, in which high quality machining and high machining capability are required. In general, electrodes of a liquid crystal panel are patterned by illuminating a transparent conductive film coated on a substrate with a laser beam while moving the substrate relative to the laser beam, thereby cutting the conductive film along lines spaced from each other at a predetermined distance. The machining quality and thus the electrical characteristics of the conductive film depend on the characteristics (mainly the peak power) of the Q-switched YAG laser used. The characteristics of the Q-switched laser in turn depend on the Q-switching frequency. If the Q-switching frequency is lowered, the pulse width becomes narrower, and the peak power becomes greater. Conversely, if the Q-switching frequency is raised, the pulse width becomes wider and the peak power becomes lower.

From the viewpoint of machining quality, it is desirable to use a lower Q-switching frequency to obtain a higher peak power of the laser beam. Then, it is possible to remove a limited portion in an instant via the ablation effect without giving thermal damage to the region near the removed portion and to the substrate on which the film is formed. Machining techniques based on the above method are disclosed in Japanese Laid-Open Patents Nos. 60-261142 and 2-259727. However, these machining techniques have disadvantage in productivity, because the lowering of the Q-switching frequency leads to the corresponding reduction in the moving speed of the stage, which in turn results in an extreme reduction in machining speed.

From the viewpoint of the machining speed, therefore, it is desirable to employ a higher Q-switching frequency to move the stage at a higher speed. However, if the Q-switching frequency is raised, the peak power becomes lower and the pulse width becomes wider. As a result, during the patterning of electrodes of a liquid crystal panel, thermal damage occurs in a glass substrate on which the electrodes are formed. The thermal damage generates microscopic cracks or depressions which may cause degradation in display quality of the liquid crystal panel. Glass contains a small amount of alkali metal. The alkali ions can dissolve into the liquid crystal via the cracks or depressions, which can cause defects in the display of the liquid crystal panel.

Thus, it becomes necessary to divide the beam into a plurality of rays of beam in order to increase the machining speed. Japanese laid-open patent Sho61-89636, discloses a method using a cylindrical lens array. However, this method has several drawbacks as indicated below:

(1) This method is effective only if the incident beams have a uniform intensity distribution. If they are not uniform (e.g., Gaussian distribution), each of the divided beams has a different intensity and the groove width processed via these beams will be varied. For example, the application of this method to the patterning of electrodes of a liquid crystal panel causes local turbulence of the field distribution due to the varied groove width, and nonuniformity occurs in the orientation of liquid crystal. This nonuniformity causes a degradation in the display quality of the liquid crystal panel.

(2) Since the number of lenses has to be the same as the beam dividing number, the size and weight of the entire lens array grow as the beam dividing number increases, which makes it difficult to adjust and hold the arrangement of the lens array. In order to create a beam of approximately 10 μm wide required for microfabrication, the numerical aperture of the lens is required to be large. Assuming that the focal length of the lens is 100 mm and the wavelength of the laser is 400 mm, the lens should be 8 mm wide with no aberration.

(3) In the case of (2), focused beam lines approximately 10 μm in width should be arranged at 8 mm intervals if a plurality of 8 mm wide lenses are lined in the form of an array. After a plurality of grooves have been formed simultaneously at intervals of the lens width, the patterning can be completed by moving the stage at desired groove intervals (e.g., 130 μm) and then repeating the process. This method does not allow a plurality of grooves to be formed simultaneously in a region as small as the width of a lens.

(4) Since the intensity distribution on the focused beam lines achieved by a cylindrical lens array is in a slit shape, there is no problem with forming a groove in a straight line. However, it is effectively impossible to form a groove in a curved or slant line.

It is apparent that problems discussed in (1), (2) and (3) are inevitable when using a cylindrical lens array or circular lens array.

To solve the above problems, it is an object of the present invention to provide a laser machining apparatus and method which can provide high machining quality and high machining efficiency. It is another object of the present invention to provide a high quality liquid crystal panel produced by using the laser machining apparatus according to the machining method.

SUMMARY DISCLOSURE OF THE INVENTION

In accordance with the broad teachings of the present invention, laser beams from one or more pulse laser generators are divided into plural beams for simultaneously processing an object. The technique for dividing the laser beams is relatively simple and lends itself to high speed applications.

According to the preferred embodiment of the present invention, there is provided a method of laser machining, including the steps of: driving a plurality of pulse laser generators such that there is a delay in phase of the generating cycle between the plurality of pulse laser generators; making beams generated by the plurality of laser generators equal in quality to each other; and converting the beams generated by the plurality of laser generators into elliptically polarized laser beams.

Thus, the present invention provides the following features or advantages:

(1) It is possible to reduce the pulse frequency of each pulse laser generator without reducing the effective total pulse frequency;

(2) Therefore, it is possible to obtain optimum peak power and an optimum pulse width, thereby performing high quality processing on an object to be processed without introducing thermal damage in it; and (3) Since an elliptically polarized laser beam is used, it is possible to maintain required high machining quality regardless of anisotropy or nonuniformity of an object to be processed and regardless of foreign particles on the object.

Furthermore, a diffraction grating is used to perform phase modulation on a beam generated by the laser generator thereby dividing the beam into plurality of laser beams. Thus, it becomes possible to simultaneously process a plurality of surface areas of an object to be processed. This allows great improvement in machining capability. That is, if the beam dividing number is assumed to be N, then it is possible to achieve the machining capability N times the capability obtainable using one laser beam.

Using the above laser machining apparatus, and according to the laser machining method of the present invention, a transparent conductive film deposited on a substrate is selectively illuminated with a plurality of laser beams while moving the substrate or the plurality of laser beams, thereby producing a plurality of open grooves in the transparent conductive film at the same time. Furthermore, the means for dividing a laser beam into a plurality of laser beams is realized by a binary phase grating having a two-level relief structure on its surface, which is adapted such that each divided laser beam has equal intensity. With this arrangement, it is possible to produce open grooves having a uniform shape and uniform quality.

The present invention also provides a liquid crystal panel having an electrode structure patterned using the above laser machining apparatus and according to the above machining method. In this liquid crystal panel, grooves (gaps) having a width less than 10 μm are uniformly formed in a display area at constant intervals. Thus, this liquid crystal panel provides a much greater contrast ratio and much better visibility performance. These are primary factors which dominate the display quality. Compared to a conventional technique in which the patterning of electrodes is performed using a photolithography technique, the present invention has an advantage that the patterning can be performed by a smaller number of processes without using wet processing. This allows a reduction in complexity of production equipment, and also ensures that reliable production control can be easily performed. Thus, it is also possible to reduce the production cost of a liquid crystal panel.

BRIEF DESCRIPTION OF THE DRAWINGS

FIG. 1 is a schematic diagram illustrating a first embodiment of a laser machining apparatus;

FIG. 2 is a schematic representation illustrating alternate driving of two laser generators;

FIG. 3 is a plan view illustrating shapes of produced grooves;

FIG. 4 is a plan view of a processed indium-tin-oxide (ITO) film;

FIG. 5 is a schematic representation illustrating the relationship between the Q-switching frequency and the beam characteristics, wherein FIG. 5(a) illustrates the relationship associated with the Q-switching frequency of 10 kHz, and FIG. 5(b) illustrates the relationship associated with the Q-switching frequency of 30 kHz;

FIG. 6 is a schematic representation illustrating the relationship between the diameter of a beam spot and the diameter of a produced circular groove;

FIG. 7 is a cross-sectional view of an ITO film and a glass substrate;

FIG. 8 is a schematic diagram illustrating the outside appearance of a one-dimensional phase grating;

FIG. 9 is a schematic diagram illustrating a second embodiment of a laser machining apparatus;

FIG. 10 is a plan view illustrating shapes of produced grooves;

FIG. 11 is a schematic diagram illustrating the amplitude transmission distribution of a spatial filter;

FIG. 12 is a cross-sectional view illustrating the shape of a beam spot for the case where a spatial filter is used (FIG. 12(a)), and for the case where no spatial filter is used (FIG. 12(b));

FIG. 13 is a schematic diagram illustrating a third embodiment of a laser machining apparatus;

FIG. 14 is a plan view illustrating shapes of produced grooves;

FIG. 15 is a schematic diagram illustrating an anamorphic condensing lens, wherein FIG. 15(a) illustrates a function of an anamorphic condensing lens, and FIG. 15(b) illustrates a light intensity distribution;

FIG. 16 is a schematic diagram illustrating a fourth embodiment of a laser machining apparatus;

FIG. 17 is a plan view illustrating shapes of produced grooves;

FIG. 18 is a plan view of a two-dimensional phase grating;

FIG. 19 is a graph illustrating improvement in the machining speed ratio;

FIG. 20 is a schematic diagram illustrating a fifth embodiment of a laser machining apparatus;

FIG. 21 is a plan view illustrating shapes of produced grooves;

FIG. 22 is a cross-sectional view illustrating the structure of a polarized beam separator;

FIG. 23 is a schematic diagram illustrating a sixth embodiment of a laser machining apparatus;

FIG. 24 is a plan view illustrating shapes of produced grooves;

FIG. 25 is a schematic diagram illustrating the structure of a deflecting separator, wherein FIG. 25(a) is a plan view of the deflecting separator, and FIG. 25(b) is a cross-sectional view of the deflecting separator;

FIG. 26 is a schematic diagram illustrating a seventh embodiment of a laser machining apparatus;

FIG. 27 is a plan view illustrating shapes of produced grooves;

FIG. 28 is a schematic representation illustrating a method of producing a slit-shape light intensity distribution, wherein FIG. 28(a) illustrates a light intensity distribution associated with a S-polarized component of a laser beam, FIG. 28(b) illustrates a light intensity distribution associated with a P-polarized component of the laser beam, and FIG. 28(c) illustrates the coherent sum of the distributions (a) and (b);

FIG. 29 is a schematic diagram illustrating an eighth embodiment of a laser machining apparatus;

FIG. 30 is a plan view illustrating shapes of produced grooves;

FIG. 31 is a schematic representation illustrating a method of producing a slit-shape light intensity distribution, wherein FIG. 31(a) illustrates a light intensity distribution associated with a S-polarized component of a laser beam, FIG. 31(b) illustrates a light intensity distribution associated with a P-polarized component of the laser beam, and FIG. 31(c) illustrates the coherent sum of the distributions (a) and (b);

FIG. 32 is a schematic diagram illustrating a ninth embodiment of a laser machining apparatus;

FIG. 33 is a schematic representation illustrating the relationship between the laser output power and time;

FIG. 34 is a plan view illustrating shapes of produced grooves;

FIG. 35 is a schematic diagram illustrating a method of mounting a liquid crystal panel, wherein: in FIG. 35(a) a tape automated bonding (TAB) tape is connected at only one side of the panel; in FIG. 35(b) TAB tapes are connected at both sides of the panel in a zigzag fashion; and in FIG. 35(c) TAB tapes are connected to the panel via an intermediate area;

FIG. 36 is a plan view of an intermediate area which connects stripe-shaped electrodes and TAB tapes;

FIG. 37 is a plan view illustrating an electrode pattern of a liquid crystal panel, wherein FIG. 37(a) illustrates an electrode pattern produced by using the laser machining apparatus of the present invention and according to the laser machining method of the present invention, FIG. 37(b) illustrates an electrode pattern produced according to a conventional technique;

FIG. 38 illustrates how 32 grooves are formed simultaneously by arranging a line of 32 focused beam spots;

FIG. 39 illustrates how 32 grooves are formed simultaneously by arranging 2 lines of 32 focused beam spots; and FIG. 40 illustrates how a groove is formed via cylinder-shaped intensity distribution of focused beam spots.

(DESCRIPTION OF THE NUMERALS)

| | |
|---|---|
| 1000: | rotating stage; |
| 1101a: | laser generator; |
| 1101b: | laser generator; |
| 1102a: | Q-switching driver; |
| 1102b: | Q-switching driver; |
| 1103: | controller; |
| 1104a: | laser beam; |
| 1104b: | laser beam; |
| 1105a: | expander collimator; |
| 1105b: | expander collimator; |
| 1106: | optical path bending mirror; |
| 1107: | polarized beam combining element; |
| 1108: | wave plate; |
| 1109: | one-dimensional phase grating; |
| 1110: | condensing lens; |
| 1111: | ITO film substrate; |
| 1112: | precision stage; |
| 1113: | laser beam spot; |
| 1201: | produced groove; |
| 1202: | ITO film; |
| 1301: | produced groove; |
| 1302: | ITO film; |
| 1401: | ITO film; |
| 1402: | SiO$_2$ buffer layer; |
| 1403: | glass substrate; |
| 2101: | spatial filter; |
| 2201: | produced groove; |
| 2202: | ITO film; |
| 3101: | anamorphic condensing lens; |
| 3201: | produced groove; |
| 3202: | ITO film; |
| 3301: | anamorphic aspheric condensing lens; |
| 3302: | laser beam; |
| 3303: | line of elliptical beam spots; |
| 4101: | two-dimensional phase grating; |
| 4201: | produced groove; |
| 4202: | ITO film; |
| 5101: | polarized beam separator; |
| 5201: | produced groove; |
| 5202: | ITO film; |
| 5301: | wedge; |
| 5302: | wedge; |
| 6101: | wave plate; |
| 6102: | polarized beam separator; |
| 6103: | optical path bending mirror; |
| 6104: | deflecting separator; |
| 6201: | produced groove; |
| 6202: | ITO film; |
| 6301: | phase grating; |
| 6302: | grating vector; |
| 6303: | normal of a substrate; |
| 6304: | wedge; |
| 6305: | normal of a wedge; |
| 7101: | polarized beam separator; |
| 7102: | one-dimensional phase grating; |
| 7201: | produced groove; |
| 7202: | ITO film; |
| 8101: | wave plate; |
| 8102: | polarized beam separator; |
| 8103: | optical path deflecting mirror; |

-continued (DESCRIPTION OF THE NUMERALS)

| | |
|---|---|
| 8104: | deflecting separator; |
| 8201: | produced groove; |
| 8202: | ITO film; |
| 9101: | laser generator; |
| 9102: | Q-switching driver; |
| 9103: | laser beam; |
| 9104: | expander collimator; |
| 9105: | optical path bending mirror; |
| 9106: | wave plate; |
| 9107: | phase grating; |
| 9108: | condensing lens; |
| 9109: | ITO film substrate; |
| 9110: | precision stage; |
| 9111: | beam spot; |
| 10101: | pixel electrode; |
| 10102: | TAB tape; |
| 10201: | pixel electrode; |
| 10202: | TAB tape; |
| 10301: | pixel electrode; |
| 10302: | TAB tape; |
| 10303: | intermediate area; |
| 10401: | produced groove; |
| 10402: | ITO film; |
| 11101: | upper side electrode gap; |
| 11102: | lower side electrode gap; |
| 11201: | upper side electrode gap; |
| 11202: | lower side electrode gap; |
| 38101: | line of 32 focused beam spots; |
| 38102: | groove; |
| 38103: | ITO film substrate; |
| 39101: | 2 lines of 32 focused beam spots; |
| 39102: | groove; |
| 39103: | ITO film substrate; |
| 40101: | line of 5 focused beam spots created by one polarization component; |
| 40102: | line of 5 focused beam spots created by the other polarization component; |
| 40103: | cylinder-shaped intensity distribution of focused beam spot; |
| 40104: | groove; |
| 40105: | ITO film substrate; |

BEST MODE FOR CARRYING OUT THE INVENTION

Referring to machining of stripe-shaped electrodes of a liquid crystal panel according to a simple matrix driving technique, aspects and features of the present invention will be described in detail.

(Embodiment 1)

FIG. 1 illustrates the configuration of an embodiment of a laser machining apparatus according to the present invention. As shown in FIG. 1, there are provided laser beam generators 1101a and 1101b each comprising a Q-switched YAG laser for emitting linearly-polarized light of TEMoo mode. The Q-switching frequencies of the laser beam generators are controlled by Q-switching drivers 1102a and 1102b so that they alternately generate their beam pulses, as will be described. There is also provided a Q-switching controller 1103 for controlling the phases of driving signals supplied by the Q-switching drivers. A Brewster element is disposed in an adequate fashion in one laser beam generator or, alternatively, a wave plate is disposed at an adequate position outside one laser beam generator so that two laser beams 1104a and 1104b may be linearly-polarized in directions perpendicular to each other. Both laser beams are expanded by associated expander collimators 1105a and 1105b. Then, optical paths of both laser beams are made common by a polarized beam combining element 1107. The polarization of each beam is changed into elliptical polarization by a wave plate 1108 and is then incident on a phase grating 1109. The phase grating 1109 divides one incident beam into 32 diffracted beams. The 32 beams emerging from the phase grating 1109 are projected via a condensing lens 1110 onto a transparent conductive film (ITO film) on a surface of substrate 1111 which is held on a precision stage 1112. Thus, 32 laser beam spots 1113 are formed on the surface of the transparent conductive film substrate 1111. The precision stage 1112 is moved so that the ITO film may be cut along lines or curves. As shown in FIG. 1, there is also provided an optical path bending mirror 1106.

After passing through the variable-magnification expander collimators 1105a and 1105b, characteristics (the spreading angle and the beam diameter) of the two laser beams 1104a and 1104b generated by the corresponding laser beam generators become equal to each other. Owing to this, the electrode film on substrate 1111 can be cut such that the width of the grooves formed by the cutting becomes uniform, as will be described later in more detail.

In the case of a linear polarized beam, an ITO film has a polarization-dependent anisotropy in optical absorption, and nonuniformity in orientation of the anisotropy may locally cause the absence of forming grooves. On the other hand, conversion of the beams into elliptically polarized beams with the wave plate allows an ITO film to be cut with uniform cutting width and depth regardless of the anisotropy or nonuniformity of an ITO film. Also, the cleanliness of the ITO film surface is not necessarily very good or uniform. Accordingly, the application of elliptically polarized beams enables the foreign particles on the ITO film to be scattered regardless of the anisotropy of the foreign particles on the film, and also allows an ITO film to be cut with uniform cutting width and depth. Thus, a desired level of cutting quality can be maintained.

In this embodiment, the phase grating 1109 comprises a one-dimensional phase grating having a two-level relief on its surface and having a substantially rectangular cross section, wherein this type of phase grating is classified as a binary phase grating. FIG. 8 is a schematic representation of the phase distribution (of one period) of a phase grating used in this embodiment. In this figure, open regions correspond to phases of $\pi$ rad, and hatched regions correspond to phases of 0 rad.

There are three important factors to be considered in designing of a phase grating. These are (1) the grating period, (2) the total size, and (3) the phase distribution in each period. A grating period is determined by the space between grooves to be formed on an ITO film. The total size is determined by the diameter of an incident laser beam. The phase distribution in each period is determined by the required uniformity in the beam intensity and the required division number of the beams.

According to the diffraction theory, a period of a phase grating can be written as:

$$p = m\lambda f/\Delta x; \quad (1)$$

m=1 for odd beam division numbers
m=2 for even beam division numbers where $\lambda$ is the laser wavelength (532 nm), f is the focal length of a condensing lens, and $\Delta x$ is the space between grooves to be produced. For example, if it is assumed that the beam division number is even, f=100 mm, and $\Delta x$=200 $\mu$m, then p=532 $\mu$m.

The total size D of a phase grating can be determined according to the following equation based on the wave optics.

$$D > d = 2f \tan[\sin^{-1}(2\lambda/\pi w)] \quad (2)$$

where d is the incident beam diameter ($1/e^2$), and w is the desired diameter of the focused spot ($1/e^2$). For example, if is assumed that f=100 mm and w=10 μm, then D>d=4 mm.

The calculation of the phase distribution of a phase grating has been carried out using the simulated annealing method (hereafter referred to as the SA method) (Science, Volume 220, pages 671–680 (1983). There are several papers discussing the design of a phase grating according to the SA method (Appl. Opt., Volume 32, pages 2512–2518 (1993); Appl. Opt., Volume 31, pages 3320–3336 (1992); Appl. Opt., Volume 31, pages 27–37 (1992)). However, when the SA method is applied, the design has to be done according to design rules established empirically. Whether a good solution can be obtained or not depends extremely on the excellence of the design rules. Here, a "good solution" is such a solution which satisfies the requirements of optical performance of a phase grating, wherein the required optical performance depends on application purposes of the phase grating.

In the design of a phase grating according to the SA method, the design rules should be established taking into account at least the following items:

(1) An evaluation function and related weights;
(2) Temperature scheduling; and
(3) Criteria for the decision of whether equilibrium has been achieved.

The evaluation function represents a value reflecting the difference between desired performance of a phase grating and estimated performance.

The phase grating for use in this embodiment should meet the following requirements:

(1) The light efficiency should be greater than 80%; and
(2) The intensity uniformity of divided beams should be greater than 0.9;

where the light efficiency is defined as the ratio of the output energy of diffracted light of the specific order to the input energy, and the beam intensity uniformity is defined as the ratio of the maximum intensity of multi-divided diffracted beams to the minimum intensity. The above conditions (1) and (2) are determined from the output power of a laser generator, machining threshold, and required machining uniformity.

In actual calculations, solutions which satisfy the above conditions (1) and (2) are determined using an evaluation function containing the above conditions (1) and (2). From these, such solutions which further satisfy the requirements (3) and (4) which will be described below are selected taking into account the process-induced errors of the phase grating.

(3) The minimum line width of the phase grating should be as large as possible; and
(4) The performance of the phase grating does not have great dependence on the process-induced errors of the phase grating.

The above requirements (3) and (4) depend on the pattern transfer performance of photolithography apparatus with a photomask, exposure and development apparatus, and etching apparatus which are used for fabrication of the phase grating.

As can be seen from the above discussion, phase distribution data of a phase grating determined according to the SA method depends on the creativity of a designer. This situation is very similar to the design of a lens. In view of the above, all data of the phase distribution of the phase gratings used in this invention will be disclosed below.

Tables 1, 2, and 3 shows positions at which phase transition occurs from 0 rad to π rad (or from π rad to 0 rad) in one period. In Tables 4, 5, and 6, one period is divided into 256 or 128 segments having the same width, and the phase of each segments is represented by "0" or "1", wherein "0" denotes 0 rad and "1" denotes π rad (or vice versa).

(Phase Grating 1)

Division Number: 32

TABLE 1

Phase Distribution of Phase Grating 1

| | | | |
|---|---|---|---|
| 0.000000 | 0.246840 | 0.595123 | 0.818825 |
| 0.048074 | 0.269661 | 0.613153 | 0.844038 |
| 0.079016 | 0.282296 | 0.628190 | 0.863233 |
| 0.095123 | 0.318825 | 0.648391 | 0.967033 |
| 0.113153 | 0.344038 | 0.670533 | 1.000000 |
| 0.128190 | 0.363233 | 0.686777 | |
| 0.148391 | 0.467033 | 0.701824 | |
| 0.170533 | 0.500000 | 0.746840 | |
| 0.186777 | 0.548074 | 0.769661 | |
| 0.201824 | 0.579016 | 0.782296 | |

(Phase Grating 2)

Division Number: 16

TABLE 2

Phase Distribution of Phase Grating 2

| | | | |
|---|---|---|---|
| 0.000000 | 0.253173 | 0.542033 | 0.781582 |
| 0.042033 | 0.281582 | 0.580009 | 0.828336 |
| 0.080009 | 0.328336 | 0.660926 | 0.843765 |
| 0.160926 | 0.343765 | 0.711175 | 0.900757 |
| 0.211175 | 0.400757 | 0.753173 | 1.000000 |

(Phase Grating 3)

Division Number: 2

TABLE 3

Phase Distribution of Phase Grating 3

| |
|---|
| 0.000000 |
| 0.500000 |
| 1.000000 |

(Phase Grating 4)

Division Number: 16

TABLE 4

Phase Distribution of Phase Grating 4

| | |
|---|---|
| 1–16 | 1 1 1 1 1 1 1 1 1 1 1 1 1 1 1 1 |
| 17–32 | 1 1 1 1 1 1 1 1 1 1 1 1 1 1 1 1 |
| 33–48 | 1 0 0 0 0 0 0 0 0 0 1 1 1 1 1 1 |
| 49–64 | 1 1 1 1 1 1 1 1 1 1 1 1 1 0 1 1 |
| 65–80 | 0 0 0 0 0 0 0 0 0 0 0 0 0 1 1 1 |
| 81–96 | 1 1 1 1 1 1 0 1 0 0 0 0 0 0 1 0 |
| 97–112 | 1 1 1 1 1 1 1 1 1 1 0 1 0 0 0 1 |
| 113–128 | 0 1 1 1 1 1 1 1 1 1 1 1 0 0 0 0 |
| 129–144 | 0 0 0 0 0 0 0 0 0 0 0 0 0 0 0 0 |
| 145–160 | 0 0 0 0 0 0 0 0 0 0 0 0 0 0 0 0 |
| 161–176 | 0 1 1 1 1 1 1 1 1 1 1 1 0 0 0 0 0 |
| 177–192 | 0 0 0 0 0 0 0 0 0 0 0 0 0 1 0 0 |
| 193–208 | 1 1 1 1 1 1 1 1 1 1 1 1 1 0 0 0 |
| 209–224 | 0 0 0 0 0 0 1 0 1 1 1 1 1 1 0 1 |
| 225–240 | 0 0 0 0 0 0 0 0 0 0 1 0 1 1 1 0 |
| 241–256 | 1 0 0 0 0 0 0 0 0 0 0 0 0 1 1 1 1 |

(Phase Grating 5)
Division Number: 8

TABLE 5

Phase Distribution of Phase Grating 5

| | |
|---|---|
| 1–16 | 1 1 1 1 1 1 1 1 1 1 1 1 0 1 0 0 |
| 17–32 | 0 0 0 0 0 0 0 0 0 0 0 0 0 0 0 0 |
| 33–48 | 0 0 0 0 1 1 1 1 1 1 1 1 1 1 1 1 |
| 49–64 | 1 1 1 0 1 1 0 0 0 0 0 0 1 0 1 0 |
| 65–80 | 1 1 1 1 1 1 1 1 1 1 1 1 1 1 1 1 |
| 81–96 | 1 1 1 1 1 1 1 1 1 1 1 1 1 1 1 1 |
| 97–112 | 1 1 1 1 1 1 1 1 1 1 1 1 1 1 1 1 |
| 113–128 | 1 1 1 1 0 0 0 0 0 0 0 0 0 0 0 0 |
| 129–144 | 0 0 0 0 0 0 0 0 0 0 0 0 1 0 1 1 |
| 145–160 | 1 1 1 1 1 1 1 1 1 1 1 1 1 1 1 1 |
| 161–176 | 1 1 1 1 0 0 0 0 0 0 0 0 0 0 0 0 |
| 177–192 | 0 0 0 1 0 0 1 1 1 1 1 1 0 1 0 1 |
| 193–208 | 0 0 0 0 0 0 0 0 0 0 0 0 0 0 0 0 |
| 209–224 | 0 0 0 0 0 0 0 0 0 0 0 0 0 0 0 0 |
| 225–240 | 0 0 0 0 0 0 0 0 0 0 0 0 0 0 0 0 |
| 241–256 | 0 0 0 0 1 1 1 1 1 1 1 1 1 1 1 1 |

(Phase Grating 6)
Division Number: 5

TABLE 6

Phase Distribution of Phase Grating 6

| | |
|---|---|
| 1–16 | 1 1 1 1 1 1 1 1 1 1 1 1 1 1 1 1 |
| 17–32 | 1 1 1 1 1 1 1 1 1 0 1 0 0 1 0 1 |
| 33–48 | 1 1 0 1 1 1 1 1 1 1 1 1 1 1 1 1 |
| 49–64 | 1 1 1 1 1 1 1 1 1 1 1 1 1 1 1 1 |
| 65–80 | 1 1 1 1 1 1 1 1 1 1 0 0 0 0 0 0 |
| 81–96 | 0 0 0 0 0 0 0 0 0 0 0 0 0 0 0 0 |
| 97–112 | 0 0 0 0 0 0 0 0 0 0 0 1 1 1 1 1 |
| 113–128 | 1 1 1 1 1 1 1 1 1 1 1 1 1 1 1 1 |

For evaluation, phase gratings with a surface relief structure were formed on a high quality quartz substrate, based on the data shown in Tables 1 through 6, according to the following processes:

(1) Generation of photomask data;
(2) Making a photomask;
(3) Exposure and development of a resist; and
(4) Reactive ion etching and removal of the resist.

Obtained phase gratings all showed light efficiency greater than 80% and beam intensity uniformity greater than 0.90. The results satisfy the above-described requirements with respect to optical performance. Furthermore, the optical performance showed no dependence on polarization of light. This means that the required light efficiency and beam intensity uniformity can be obtained regardless of polarization of incident light. This is preferred in machining of a thin film using an elliptically polarized light beam.

A phase grating fabricated in the above-described manner was installed in a laser machining apparatus such as that shown in FIG. 1. Using this laser machining apparatus, an ITO film on a glass substrate was cut to form grooves with a width of 10 μm at intervals of 200 μm thereby forming stripe-shaped electrodes of a liquid crystal panel. FIG. 7 illustrates cross sections of the ITO film and the glass substrate, wherein soda-lime glass was used as a material of the glass substrate 1403, and the ITO film 1401 having a thickness of 1500 Å was formed on the glass substrate 1403 via an $SiO_2$ buffer layer 1402.

A phase grating which was made according to the data of phase grating 1 described above was employed here as the phase grating for dividing the light beam. To form open grooves having a width of 10 μm at intervals of 200 μm on the ITO film, a condensing lens having a focal length of 100 mm was used, and the period of the phase grating was selected to 532 μm. Furthermore, the beam diameter and the size of the phase grating were set to 12 mm and 15 mm, respectively, taking into account the aberration of the condensing lens. In this case, the minimum line width of the phase grating becomes 6.4 μm. Relief structure was formed on the quartz substrate according to the above-described processes, and a phase grating with dimensions nearly equal to designed values was successfully obtained.

Lamp-pumped-pumped Q-switched YAG lasers produced by Quantronix were employed as laser beam generators, wherein these lasers can generate 8-W (Watts) rated power of laser beam having a wavelength of 532 nm. To examine the relationship between machining conditions and resulting damage, a single open groove was formed repeatedly by directly illuminating a laser beam without through the phase grating at various Q-switching frequencies.

The experiments revealed that open grooves can be formed without damaging an ITO film and a glass substrate under the film if the peak power and pulse width meet the following conditions.

(1) 110W <(peak power)<200 W
(2) (pulse width)<200 nsec.

Here, the threshold value for the peak power required in cutting the ITO film used in this embodiment is approximately 110 W. Each of the above conditions may vary depending on the composition and thickness of an ITO film and the laser wavelength.

FIGS. 5(*a*) and 5(*b*) illustrate the relationship between the laser output power and time, for Q-switching frequencies of 10 kHz and 30 kHz, respectively. If it is assumed that the peak power during a machining process is 150 W, then the pulse width and pulse energy become 150 nsec and 23 μJ, respectively, for the Q-switching frequency of 10 kHz, and 300 nsec and 45 μJ for 30 kHz. When an ITO film on a glass substrate was processed under the above conditions, no damage was observed if 10 kHz was employed as the Q-switching frequency. However, when 30 kHz was employed as the Q-switching frequency, micro damages were introduced at edges of the grooves and at the surface of the glass substrate. The damage occurred when 30 kHz was used because a 30-kHz pulse has a greater pulse width and thus excess energy was applied to the sample. When the peak power is greater than a threshold value required for machining, if the pulse width determined by the Q-switching frequency is greater than an allowable maximum value, then damage is introduced during the machining. Reducing the pulse energy with the intention of preventing the damage is not effective, since the peak power will become less than the threshold value required for machining.

In view of the above, and taking into account the beam division number and the machining speed, the Q-switching frequency and the rated average output power were determined as 10 kHz and 8 W, respectively, for both laser beam generators. In this case, the pulse width and the peak power become 150 nsec and 5.3 kW, respectively. Furthermore, it has been decided that each Q-switching driver should be driven by the control signals provided by the Q-switching controller 1103 such that there be a phase delay of 50 μsec between two Q-switching drivers. FIG. 2 illustrates the relationship between the laser output power and time in this embodiment, wherein each laser beam generator operates at 10 kHz. However, two laser beam generators are driven alternately with a phase delay so as to achieve a high machining speed equivalent to that obtained at 20 kHz.

Peak power greater than 110 W is required to form a single open groove on an ITO film having a thickness of 1500 Å. Therefore, it was decided that a laser beam having peak power of 5.3 kW be divided into 32 beams by using the above-described phase grating 1109. Furthermore, 32 beams were subjected to optical Fourier transform via a condensing lens so that 32 focused beam spots spaced at 200 μm intervals could be created, which is shown in FIG. 38. In the figure, reference number 38101 refers to a line of focused beam spots. 32 grooves 38102 can be simultaneously formed on an ITO film by moving the ITO film substrate 38103 in the direction of the arrow shown in the figure. FIG. 6 shows the relationship between the diameter of a focused beam spot and the diameter of a formed groove. The diameter of a focused beam spot and the groove formed on an ITO film is 18 μm and 10 μm, respectively. The diameter of a formed groove is smaller than that of a focused beam spot due to the threshold property of an ITO film.

As described above, this method allows 32 grooves of the diameter of 10 μm to be formed at the same time with a single pulse.

In a time interval of 50 μsec before another pulse was generated, the substrate was moved 5 μm by using a precision stage 1112, wherein this moving distance corresponds to one half the diameter of a hole produced by the beam illumination. In this way, 32 holes each having a diameter of about 10 μm were formed at a time with illumination of a pulse beam generated alternately by two laser beam generator, and this process was performed repeatedly thereby successfully producing continuous grooves each having a width of 10 μm at intervals of 200 μm, as shown in FIG. 3. In this processing, the stage was moved at a constant speed of 100 mm/sec. If the processing speed is defined as:

(The processing speed)=(The beam division number)×(The stage speed)

then the total processing speed of 3200 mm/sec can be achieved since 32 lines are processed at a time. FIG. 4 illustrates an electrode pattern which has been obtained by the above-described processing.

If the 32 focused beam spots are aligned along a line at a certain angle to the moving direction of the stage, the effective beam spot intervals or the intervals between resulting grooves can be adjusted. This can be accomplished by employing a rotary stage 1000 or rotating the phase grating in its plane. If it is assumed that the phase grating is rotated by an angle of θ, then the interval Δx' between resulting grooves is given by:

$$\Delta x' = m\lambda f \cos(\theta)/p; \quad (3)$$

m=1 (for odd beam division numbers)
m=2 ((for even beam division numbers)

This adjustment mechanism allows high precision patterning of electrodes which can meet the required specifications of a liquid crystal panel. Furthermore, the mechanism can be used to readily perform trial production of liquid crystal panels having various electrode intervals. This allows a great reduction in lead time for development of a new product.

According to the machining method and apparatus of the present invention, it is possible to pattern an ITO film such that grooves having a width less than 10 μm are produced. Therefore, it is possible to improve the aperture ratio and the contrast ratio of a liquid crystal panel wherein these are primary factors which dominate the display quality. In contrast, the minimum electrode gap which can be obtained by conventional photolithography techniques is 30 μm. This rather large gap is a main cause for degradation in the aperture ratio and in the contrast ratio of a liquid crystal panel.

In the present embodiment, lamp-pumped Q-switched YAG lasers are used. Alternatively, diode-laser-pumped Q-switched YAG lasers may also be used. Furthermore, YLF lasers may also be used instead of YAG lasers to obtain a similar effect. In addition to solid state lasers, gas lasers which can operate in a pulse mode may also be used. The Q-switching frequency adequate for machining depends on the characteristics of a laser beam generator, and thus the Q-switching frequency is not limited only to 10 kHz which has been referred to in the present embodiment. Therefore, it is required to select a proper Q-switching frequency depending on the characteristics of a laser beam generator used and on the property of an object to be machined.

In the above embodiment, the invention has been described referring to the formation of grooves having a width of 10 μm at intervals of 200 μm. However, the present invention can be readily applied to formation of other kinds of grooves by (1) changing the geometric period of the phase grating, and/or (2) changing the focal length of the condensing lens. Furthermore, the beam division number is not limited to 32, and can be determined according to specific requirements of a laser beam machining apparatus. For example, if required for machining, a phase grating which can divide a beam into 16 beams can be made according to the data shown in Table 2 or 4. The optimum beam division number should be determined taking the following factors into consideration: (1) the properties of an object to be machined; and (2) the output power of a laser beam generator used, and the number of laser beam generators. Taking the required machining capability into consideration, the beam division number is thus determined. According to the above, a phase grating proper for a specific application may be readily designed and made. Thus, the present invention is applicable for various applications.

(Embodiment 2)

FIG. 9 illustrates the configuration of a second embodiment of a laser machining apparatus according to the present invention. This embodiment has the same configuration as the first embodiment except that there is provided a spatial filter 2101 disposed in the middle of the optical path. The beam wavefront is modulated by the spatial filter so as to control the shape of the focused beam spot.

The introduction of the spatial filter 2101 allows formation of grooves having a smaller width thereby further improving the display quality of a liquid crystal panel. An alternative method to a reduced width in grooves is (1) to employ a condensing lens having a shorter focal length, or (2) to increase the diameter of a beam incident on the condensing lens. In the method (1), however, the minimum line width of the phase grating should be very small (less than 2 μm), and it is difficult to produce such a phase grating. In the method (2), it is difficult to design and produce a large-diameter condensing lens showing no aberration, and thus the lens cost will be much greater.

In this embodiment, an amplitude filter having an amplitude transmission distribution such as that shown in FIG. 11 is used as the spatial filter. The amplitude filter is such a filter which modulates only the amplitude of a light beam passing through the filter without changing its phase. The filter is preferably formed by evaporating aluminum and depositing it onto the surface of the phase grating substrate. The amplitude filter 2101 is disposed in just front of the phase grating 1109 so that the beam wavefront is subjected to amplitude modulation. FIGS. 12(*a*) and 12(*b*) illustrate shapes of focused beam spots for respective cases where the amplitude filter is used and where it is not used. As shown, the relative intensity of an outer portion of the beam is increased whereby the effective diameter of the focused beam spot is decreased.

FIG. 10 is a plan view illustrating grooves which can be obtained when the amplitude filter is used. Grooves having a width of as small as about 6 μm have been successfully formed. This allows the aperture ratio and the contrast ratio of a liquid crystal panel to be further improved compared to the first embodiment.

If additional amplitude filters having various transmission distributions are prepared, it is possible to replace the amplitude filter with another one more suitable for formation of a required greater or smaller width of a groove. The required transmission distribution may also be achieved by forming an evaporated layer or the like on the back face of the phase grating substrate (the face on which no grating is formed).

(Embodiment 3)

FIG. 13 illustrates the configuration of a third embodiment of a laser machining apparatus according to the present invention. This embodiment has the same configuration as the first embodiment except that a condensing lens 3101 having astigmatism is employed. The condensing lens having astigmatism produces focused beam spots having an elliptic shape whose longer axis is parallel to the moving direction of the stage.

The condensing lens 3101 is anamorphic such that it causes different wavefront transforms between two directions perpendicular to each other (the x- and y-directions). For example, the transmitted wavefront of the phase grating is optically Fourier-transformed in the x-direction, and the intensity distribution of the wavefront is controlled in the y-direction. An anamorphic condensing lens of this kind can be realized with (1) an aspheric lens, or (2) a combination of spherical and cylindrical lenses. Through the anamorphic condensing lens, focused beam spots having an elliptic shape whose longer axis is parallel to the moving direction of the stage are obtained. This allows the stage to be moved at a greater speed to increase the machining speed.

FIG. 15 illustrates an anamorphic aspheric condensing lens and beam spots produced through it. In FIG. 15(a), there are shown a phase grating 1109, an anamorphic aspheric condensing lens 3301, laser beams 3302, and a line of 32 beam spots 3303. The phase grating is one-dimensional in which the periodic grating structure is formed only in the x-direction, as in the phase grating used in the first embodiment. The anamorphic aspheric condensing lens performs the optical Fourier transform of the wavefront in the x-direction, and converts the intensity distribution of the wavefront from a Gaussian distribution to a square-shaped distribution in the y-direction. FIG. 15(b) illustrates a light intensity distribution in the y-direction of a beam spot obtained. The width and the length of the obtained beam spot are 18 μm and 28 μm, respectively, wherein the width and the length are defined as such a width and length at which the beam intensity becomes $1/e^2$ times the peak intensity. By illuminating an ITO film with these beam spots, it is possible to partially remove the ITO film so as to form grooves having a width of 10 μm and a length of 20 μm.

In this embodiment, as described above, 32 diffracted beams are subjected to the optical Fourier transform via the anamorphic condensing lens thereby producing grooves having a width of 10 μm and a length of 20 μm at intervals of 200 μm on the surface of an ITO film. In a time interval of 50 μsec, the stage was moved by 10 μm corresponding to one half the length of a groove produced by the beam illumination. In this way, 32 grooves each having a width of 10 μm and a length of 20 μm can be formed at the same time with illumination of a pulse beam generated alternately by two laser beam generators, and this process is performed repeatedly thereby successively producing continuous grooves each having a width of 10 μm at intervals of 200 μm, as shown in FIG. 14. In this processing, the stage is moved at a constant speed of 200 mm/sec, and thus an effective machining speed of as high as 6400 mm/sec can be achieved.

The stage moving speed can be increased further unless individual grooves are not separated from each other, thereby increasing the machining speed to an upper limit.

(Embodiment 4)

FIG. 16 illustrates the configuration of a fourth embodiment of a laser machining apparatus according to the present invention. This embodiment has the same configuration as the first embodiment except that a two-dimensional phase grating is used instead of the one-dimensional phase grating.

Use of the two-dimensional phase grating 4101 enables two or more lines or rows of beam spots to be generated at the same time.

FIG. 39 shows 2 lines of 32 focused beam spots created by this grating. Reference number 39101 refers to a line of focused beam spots. The diameter of each focused beam spot is 18 μm, and intervals of focused beam spots are at 200 μm in the column direction. On the other hand, as discussed later, the interval of focused beam spots in the row direction can be described as $(2k+1)\Delta y$, where $\Delta y$ represents the half amount of the stage movement. For example, if $k=1$ and $\Delta y = 5$ μm, the interval of spots in the row direction can be determined to be 15 μm. 32 grooves 39102 can be formed on an ITO film at the same time by moving the ITO film substrate in the direction of the arrow shown in the figure.

The phase distribution of the two-dimensional grating can be realized by placing two one-dimensional gratings one on another such that each orientation is perpendicular to each other. A one-dimensional grating can have a phase value of either 0 or π, and therefore a two-dimensional grating also has a phase value of either 0 or π as shown below.

$$0+0=0;\ 0+\pi=\pi;\ \pi+\pi=2\pi(=0) \tag{4}$$

A two-dimensional grating which can produce 32×2 beam spots at the same time for use in this embodiment can be designed and made according to the data on the phase grating 1 and the phase grating 3 described in connection with the first embodiment. FIG. 18 is a plan view of the phase grating, illustrating its phase distribution.

Here, the interval of beam spots between the first and second lines will be described as $(2k+1)\Delta y$, and the amount of the stage movement during a time interval between pulses will be described as $2\Delta y$. A detailed investigation on the relationship between the amount of the stage movement and the beam spot intervals has revealed that there are circular holes separated from each other in a region at which the machining has started. Taking this fact into consideration, the machining speed has been determined such that the machining done by the n-th laser pulse should be performed at a speed whose relative coefficient β to the machining speed for one line of beam spots is described below in equation (5):

$$\beta=2\{1-k/n\}\ (k=1, 2, 3, \ldots) \tag{5}$$

where $\Delta y$ is an amount determined taking into account the diameter of a beam spot. Since there is a phase difference between the first and second lines of beam spots, the interval between beam spots $(2k+1)\Delta y$ should be expanded to a proper value so that a change in the spot shape arising from this phase difference will not give any bad effect to the machining.

The relationship represented by equation (5) is illustrated graphically in FIG. 19. Since the interval between beam spots $(2k+1)\Delta y$ is negligibly small relative to a distance the stage has to move across the display area of a liquid crystal panel (wherein this distance is equal to the product of the number of laser pulses and the stage movement per pulse interval), the machining speed ratio β is substantially equal to 2. That is, it is possible to achieve a machining speed twice that of the one-dimensional grating.

In this embodiment, the beam spot interval in the direction of the stage movement is determined as 15 μm, and the stage moves 10 μm each pulse interval of 50 μsec (which means k=1 and $\Delta y$=5 μm). In this way, 32×2 holes having a diameter of 10 μm can be formed at the same time with illumination of a pulse beam generated alternately by two laser beam generators, and this process is performed repeatedly thereby successfully producing continuous grooves each having a width of 10 μm at intervals of 200 μm, as shown in FIG. 17. In this processing, the stage is moved at a constant speed of 200 mm/sec, and thus an effective machining speed of as high as 6400 mm/sec can be achieved. At the left end of FIG. 17, there remain some areas which should have been removed. This results from the relationship between the stage moving speed and the beam spot interval. However, the unremoved areas are so small to be neglected.

If the number of beams divided in the direction of the stage movement is increased, and if the number of beam spots and the beam spot interval are represented by m and $(mk+1)\Delta y$, respectively, then the machining speed ratio β can be given by $$\beta = m\{1-(m-1)k/n\} \; (k=1, 2, 3, \ldots) \quad (6)$$

As can be seen from equation (6), the machining speed ratio β increases by a factor of m relative to the case where the machining is done using one line of beam spots, and thus a great increase in the machining speed can be achieved.

(Embodiment 5)

FIG. 20 illustrates the configuration of a fifth embodiment of a laser machining apparatus according to the present invention. This embodiment has the same configuration as the first embodiment except that a one-dimensional grating is combined with a polarized beam separator so that plural lines or rows of beam spots can be generated at the same time.

Linearly-polarized light of TEMoo mode is emitted by laser beam generators 1101a and 1101b each comprising a Q-switched YAG laser. A Brewster element is disposed in an adequate fashion in a laser beam generator or otherwise a wave plate is disposed at an adequate position outside a laser beam generator so that two laser beams 1104a and 1104b may be linearly-polarized in directions perpendicular to each other. Both laser beams 1104a and 1104b are expanded by associated expander collimators 1105a and 1105b. After passing through a polarized beam combining element 1107, both beams travel along the same optical path and are incident on the polarized beam separator 5101.

The polarized beam separator 5101 is arranged such that its leading phase axis (or delaying phase axis) is at an angle of 45° to the polarization directions of the beams. Two beam-components polarized into directions perpendicular to each other are separated from each other by a predetermined angle. These separated components are changed to elliptically polarized beams by wave plate 1108, and are incident on the phase grating 1109. The phase grating 1109 has the same structure as that used in the first embodiment. One beam is divided into 32 beams by this phase grating 1109. After passing through the phase grating 1109, the beams are focused via a condensing lens 1110 into 2 lines of 32 beam spots at a predetermined interval onto an ITO film. Since there is a phase difference between the first and second lines of beam spots, the beam interval should be expanded to a proper value so that a change in the spot shape arising from this phase difference will not give any bad effect to the machining. In this way, the machining speed ratio β can be increased by a factor of 2 as in the two-dimensional grating (the fourth embodiment).

FIG. 22 is a schematic diagram illustrating the polarized beam separator 5101 used in this embodiment. This element is composed of two wedges (5301, 5302) connected to each other wherein the wedges have refractive indices different from each other. If refractive indices of one wedge are represented by $n_{1e}$, $n_{1o}$, and refractive indices of the other wedge are represented by $n_{2e}$, $n_{2o}$ where subscripts e and o refer to an extraordinary light beam and an ordinary light beam, respectively, then materials of wedges should be selected such that their refractive indices satisfy the relationships $n_{1e}=n_{1o}$, $n_{2e} \pi n_{2o}=n_{1e}$. With this arrangement, 32 diffracted beams obtained from an S-polarized component travel along a straight path, and 32 diffracted beams obtained from a P-polarized component are deflected by a predetermined angle. If the combination of refractive indices is properly selected, it is also possible to have both beams deflected by predetermined angles in directions opposite to each other.

The distance $(2k+1)\Delta y$ between the first line of beam spots and the second line and the separation angle θ given by the polarized beam separator have the following relationship:

$$(2k+1)\Delta y = f \cdot \theta \quad (7)$$

From equation (7), the separation angle θ can be written as:

$$\theta = (2k+1)\Delta y / f \quad (8)$$

For example, if it is assumed that f=100 mm, $(2k+1)\Delta y$=15 μm, then θ=0.15 rad.

Denoting the angle of a wedge by φ and further letting Δn denote the difference in the refractive index between wedges required to obtain a desired deflection, the following relationship can be obtained:

$$\phi \cdot \Delta n \approx \theta \quad (9)$$

Therefore, if θ=150 mrad, then Δn≈0.001. The value given here for Δn is practically achievable.

In this embodiment, the beam spot interval in the direction of the stage movement is determined as 15 μm, and the stage moves 10 μm for each pulse interval of 50 μsec. In this way, 32×2 holes having a diameter of 10 μm can be formed at the same time with illumination of a pulse beam generated alternately by two laser beam generators, and this process is performed repeatedly thereby successfully producing continuous grooves each having a width of 10 μm at intervals of 200 μm, as shown in FIG. 17. In this processing, the stage is moved at a constant speed of 200 mm/sec, and thus an effective machining speed of as high as 6400 mm/sec can be achieved.

In this embodiment, one polarized beam separator is used to produce 32×2 beam spots at the same time. However, alternatively, a plurality of polarized beam separators placed one on another via a wave plate may also be used. In this case, two or more lines of 32 beam spots can be produced at the same time.

(Embodiment 6)

FIG. 23 illustrates the configuration of a sixth embodiment of a laser machining apparatus according to the present invention. This embodiment has the same configuration as the first embodiment except that a one-dimensional grating is combined with a deflecting separator so that two lines of beam spots can be generated at the same time.

Linearly-polarized light of TEMoo mode is emitted by laser beam generators 1101a and 1101b each comprising a Q-switched YAG laser. A Brewster element is disposed in an adequate fashion in a laser beam generator or otherwise a wave plate is disposed at an adequate position so that two laser beams 1104a and 1104b may be linearly-polarized in directions perpendicular to each other. Both laser beams are expanded by associated expander collimators 1105a and 1105b. Both the beams are combined by a polarized beam combining element 1107, and then the beams travel along the same optical path. Via the wave plate 6101, the polarization directions of beams are made to be at 45° to the leading phase axis (or delaying phase axis) of the polarized beam separator 6102. With this arrangement, the beams incident on the polarized beam separator 6102 are equally amplitude-divided. The respective divided components are changed to elliptically polarized beams by a wave plate 1108, and incident on the deflecting separator 6104.

FIG. 25 illustrates the configuration of the deflecting separator 6104. The deflecting separator 6104 has a phase grating on its surface and a wedge on its back face. The phase grating 6301 has two regions denoted by A and B in FIG. 25, wherein the region A receives one half-amplitude component of the beam which was divided by the beam separator 6102, and the region B receives the other half-amplitude component. Both phase gratings in regions A and B can be made according to the data with respect to the phase grating 4 described above in connection with the first embodiment. With these phase gratings in regions A and B, two equally amplitude-divided components are each divided into 32 beams. The wedge normal 6305 of the wedge 6304 is on a plane defined by the normal 6303 of the substrate and the grating vector 6302 of the phase grating in the region B.

With the wedge 6304 formed on the back face of the deflecting separator 6104, two amplitude components having passed through the respective phase gratings are made to travel in directions different from each other by a predetermined angle. Thus, 32 beams produced from one half-amplitude component and 32 beams produced from the other half-amplitude component are projected via the condensing lens 1110 onto an ITO film thereby forming two lines of 32 beam spots apart in the direction of the stage movement from each other by a predetermined distance.

In this embodiment, the beam spot interval is determined as 15 μm, and the stage is moved 10 μm for each pulse interval of 50 μsec, thereby successfully producing continuous grooves each having a width of 10 μm as shown in FIG. 24. In this processing, the stage is moved at a constant speed of 200 mm/sec, and thus an effective machining speed of as high as 6400 mm/sec can be achieved. In this way, the machining speed ratio can be increased by a factor of 2 as in the two-dimensional grating.

(Embodiment 7)

FIG. 26 illustrates the configuration of a seventh embodiment of a laser machining apparatus according to the present invention. This embodiment has the same configuration as the first embodiment except that instead of producing a plurality of open grooves at the same time, beams are projected onto an object to be processed such that a long-and-narrow stripe-shaped beam-intensity distribution is formed on the object wherein the distribution is longer in the direction of the stage movement. This arrangement allows the stage to be moved at a higher speed, and thus a higher machining speed can be obtained.

Linearly-polarized light of TEMoo mode is emitted by laser beam generators 1101a and 1101b each comprising a Q-switched YAG laser. A Brewster element is disposed in an adequate fashion in a laser beam generator or otherwise a wave plate is disposed at an adequate position outside a laser beam generator so that two laser beams 1104a and 1104b may be linearly-polarized in directions perpendicular to each other. Both laser beams 1104a and 1104b are expanded by associated expander collimators 1105a and 1105b. Both the beams are combined by a polarized beam combining element 1107. Then, the beams travel along the same optical path and are incident on a polarized beam separator 7101. The polarized beam separator used in this embodiment has basically the same structure as that shown in FIG. 22. In the configuration of the present embodiment shown in FIG. 26, a wave plate for changing the beam into an elliptically polarized form is not used.

Two beam-components polarized into directions perpendicular to each other are separated from each other by a predetermined angle, and then these separated components are incident on the phase grating 7102. The phase grating 7102 can be made according to the data of phase grating 6 described above in connection with the first embodiment. This phase grating is used to divide a beam into 5 beams. FIG. 40 shows how focused beam spots are arranged on the film. 5 diffracted beams produced from one polarization component and 5 diffracted beams produced from the other polarization component are projected via the condensing lens 1110 onto an ITO film thereby forming lines of beam spots 40101 and 40102 in a line parallel to the direction of the stage movement wherein the lines are apart half an interval between spots. Reference number 40103 refers to cylinder-shaped intensity distribution of focused beams achieved by overlapping these 2 spot lines. A groove 40104 can be formed on an ITO film by moving the ITO film substrate 40105 in the direction of the arrow shown in the figure.

FIG. 28 illustrates the light intensity distribution produced by the beam illumination onto the surface of an ITO film. FIG. 28(a) illustrates the light intensity distribution produced from one polarization component, and FIG. 28(b) illustrates the light intensity distribution produced by the other polarization component. As can be seen, these light intensity distributions are shifted from each other half the spot interval. If these light intensity distributions are added together in a coherent fashion (taking into account both amplitude and phase), the resultant distribution becomes such as that shown in FIG. 28(c). In this way, it is possible to produce a light intensity distribution having a width nearly equal to the diameter of a spot and a length about 5.5 times the diameter of a spot. Since the light intensity distributions shown in FIGS. 28(a) and 28(b) are polarized into directions perpendicular to each other, no interference occurs between these distributions. This means that the phase difference between neighboring beam spots does not cause interference, and therefore a substantially uniform light intensity distribution can be obtained.

To form a groove having a uniform width and a uniform depth, the light projected onto an ITO film should have a uniform intensity distribution. The intensity uniformity of the light projected onto an ITO film depends on the relative sizes of the beam and the phase grating. In this embodiment, the diameter of a beam incident on the phase grating is set to about twice the grating period. The complex amplitude distribution in the line of spots is optimized by adjusting the diameter of a beam using an expander collimator. If the beam diameter is assumed to be 12 mm ($1/e^2$), then the period p of the phase grating should be 6.5 mm.

There is a relationship described below in equation 10 between the shift Δs associated with the lines of beam spots and the separation angle θ given by the polarized beam separator.

$$\Delta s = f \cdot \theta \quad (10)$$

From the above discussion, a shift equal to half the spot diameter in the direction of the stage movement can be produced between the beam spot lines, that is, Δs can be w/2, by employing θ equal to 50 μm, wherein w is assumed to be 10 μm and f is assumed to be 100 mm.

Denoting the angle of a wedge of the polarized beam separator by φ and further letting Δn denote the difference in the refractive index required to obtain the deflection, the following relationship should be satisfied:

$$\phi \cdot \Delta n \approx \theta \quad (11)$$

Therefore, if φ=50 mrad, then Δn≈0.001. The value given here for Δn is practically achievable.

In this embodiment, one laser beam having peak power of 5.3 kW is divided into two beams by the polarized beam separator. Furthermore, five diffracted beams are obtained from each of these divided beams via the phase grating 7102. Then, ten diffracted beams in total are subjected to the optical Fourier transform via the condensing lens 1110, and thus a light intensity distribution having a width of 18 μm and a length of 99 μm is formed on the surface of an ITO film. This light intensity distribution allows a portion having a width of 10 μm and a length of 91 μm to be removed from the ITO film.

In this embodiment, the stage is moved 45 μm for each pulse interval of 50 μsec, thereby successfully producing a continuous groove having a width of 10 μm as shown in FIG. 27. In this embodiment, the machining speed is equal to the stage moving speed, and a machining speed of 900 mm/sec can be obtained in the above example.

In this embodiment, the phase grating is adapted to divide a beam into five beams. However, it is possible to employ a phase grating to produce a greater or smaller number of divided beams so as to satisfy the requirements regarding the stage control system. The optimum beam diameter and the optimum size of the phase grating should be determined taking the following factors into consideration: (1) The threshold property of an object to be machined; (2) The output power of a laser beam generator used, and the number of laser beam generators; and (3) The load to the stage control system. According to the above consideration, the complex amplitude distribution of the beam-spot line is optimized so that uniform grooves can be produced.

(Embodiment 8)

FIG. 29 illustrates the configuration of an eighth embodiment of a laser machining apparatus according to the present invention. This embodiment has the same configuration as the first embodiment except that instead of producing a plurality of open grooves at the same time, beams are projected onto an object to be processed such that a stripe-shaped beam-intensity distribution is formed on the object wherein the distribution is longer in the direction of the stage movement. This arrangement allows the stage to be moved at a higher speed, and thus a higher machining speed can be obtained.

Linearly-polarized light of TEMoo mode is emitted by laser beam generators 1101a and 1101b each comprising a Q-switched YAG laser. A Brewster element is disposed in an adequate fashion in a laser beam generator or otherwise a wave plate is disposed at an adequate position outside a laser beam generator so that two laser beams 1104a and 1104b may be Linearly-polarized in directions perpendicular to each other. Both laser beams 1104a and 1104b are expanded by associated expander collimators 1105a and 1105b. Then, both beams are combined by a polarized beam combining element 1107, and the beams travel along the same optical path. Via the wave plate 8101, the polarization directions of beams are made to be at 45° to the leading phase axis (or delaying phase axis) of the polarized beam separator 8102. With this arrangement, the beams incident on the polarized beam separator 8102 are equally amplitude-divided. The respective divided components are incident on the deflecting separator 8104. The polarized beam separator used in this embodiment has basically the same structure as that shown in FIG. 25. The deflecting separator 8104 has a phase grating on its surface and a wedge on its back face. The phase grating has two regions, wherein one region receives a separated half-amplitude component, and the other region receives the other half-amplitude component. Phase gratings in both regions can be made according to the data with respect to the phase grating 1 described above in connection with the first embodiment.

With the wedge formed on the back face of the deflecting separator 8103, two amplitude components having passed through the phase gratings are made to travel in directions different from each other by a predetermined angle. Thus, eight beams produced from one amplitude component and eight beams produced from the other amplitude component are projected via the condensing lens 1110 onto an ITO film thereby forming two lines of beam spots parallel to the direction of the stage movement wherein the lines are apart half an interval between spots.

FIG. 31 illustrates the light intensity distribution produced by the beam illumination onto the surface of an ITO film. FIG. 31(a) illustrates the light intensity distribution produced from one polarization component, and FIG. 31(b) illustrates the light intensity distribution produced by the other polarization component. As can be seen, these light intensity distributions are shifted from each other half the spot interval. If these light intensity distributions are added together, the resultant distribution becomes such as that shown in FIG. 28(c). In this way, it is possible to produce a light intensity distribution having a width nearly equal to the diameter of a spot and a length about 8.5 times the diameter of a spot. Since the light intensity distributions shown in FIGS. 31(a) and 31(b) are polarized into directions perpendicular to each other, no interference occurs between these distributions. This means that the phase difference between neighboring beam spots does not cause interference, and therefore a substantially uniform light intensity distribution can be obtained. In the configuration of the present embodiment shown in FIG. 29, a wave plate for changing a beam 1113 into an elliptically polarized form is not used.

To form a groove having a uniform width and a uniform depth, the light projected onto an ITO film should have a uniform intensity distribution. The intensity uniformity of the light projected onto an ITO film depends on the relative sizes of the beam and the phase grating. In this embodiment, the diameter of a beam incident on the phase grating is determined to be equal to the grating period. The complex amplitude distribution of the spot line is optimized by adjusting the diameter of a beam using an expander collimator. If the beam diameter is assumed to be 12 mm ($1/e^2$), then the period p of the phase grating becomes 12 mm.

There is a relationship described below in equation 12 between the shift $\Delta s$ associated with the lines of beam spots and the separation angle $\phi$ given by the polarized beam separator.

$$\Delta s = f \cdot \theta \tag{12}$$

From the above discussion, a shift equal to half the spot diameter in the direction of the stage movement can be produced between the beam spot lines, that is $\Delta s$ can be $w/2$, by employing $\theta$ equal to 50 $\mu$m, wherein w is assumed to be 10 $\mu$m and f is assumed to be 100 mm.

Denoting the angle of a wedge of the polarized beam separator by $\phi$ and further letting $\Delta n$ denote the difference in the refractive index required to obtain the deflection, the following relationship should be satisfied:

$$\phi \cdot \Delta n \approx \theta \tag{13}$$

Therefore, if $\phi = 50$ mrad, then $\Delta n \approx 0.001$. The value given here for $\Delta n$ is practically achievable.

In this embodiment, one laser beam having peak power of 5.3 kW is divided into two beams by the polarized beam separator. Furthermore, eight diffracted beams are obtained from each of these divided beams via the phase grating 8104. Then, sixteen diffracted beams in total are subjected to the optical Fourier transform via the condensing lens 1110, and thus a light intensity distribution having a width of 18 $\mu$m and a length of 153 $\mu$m is formed on the surface of an ITO film. This light intensity distribution allows a portion having a width of 10 $\mu$m and a length of 145 $\mu$m to be removed from the ITO film.

In this embodiment, the stage is moved 70 $\mu$m for each pulse interval of 50 $\mu$sec, thereby successfully producing a continuous groove having a width of 10 $\mu$m as shown in FIG. 31. In this embodiment, the machining speed is equal to the stage moving speed, and a machining speed of 1400 mm/sec can be obtained in the above example.

In this embodiment, the phase grating is adapted to divide a beam into eight beams. However, it is possible to employ a phase grating to produce a greater or smaller number of divided beams so as to satisfy the requirements regarding the stage control system. The optimum beam diameter and the optimum size of the phase grating should be determined taking the following factors into consideration: (1) The threshold property of an object to be machined; (2) The output power of a laser beam generator used, and the number of laser beam generators; and (3) The load to the stage control system. According to the above consideration, the complex amplitude distribution of the beam spot line is optimized so that uniform grooves can be produced.

(Embodiment 9)

FIG. 32 illustrates the configuration of a ninth embodiment of a laser machining apparatus according to the present invention. This embodiment has the same configuration as the first through eighth embodiments except that there is provided only one laser beam generator.

Linearly-polarized light of TEMoo mode is emitted by a laser beam generator 9101 comprising a Q-switched YAG laser. The Q-switching frequency of the laser beam generator is controlled by Q-switching driver 9102. The laser beam 9103 emitted by the laser beam generator is expanded by the expander collimator 9104. The polarization of the beam is changed into elliptical polarization by a wave plate 9106 and is then incident on a phase grating 9107. The phase grating 9107 is used to divide an incident beam into 32 diffracted beams. The 32 beams transmitted from the phase grating 9107 are projected via a condensing lens 9108 onto an ITO film 9109 held on a precision stage 9110 thereby producing 32 beam spots 9111 at predetermined intervals on the surface of the ITO film. The precision stage 9110 is moved so that the ITO film is cut along lines or curves. As shown in FIG. 1, there is also provided an optical path bending mirror 9105.

The laser beam is converted into an elliptically polarized form by the wave plate, whereby an ITO film can be cut with constant cutting width and depth regardless of anisotropy or nonuniformity of the ITO film and regardless of the foreign particles on the ITO film. Thus, it is possible to maintain required cutting quality.

A Lamp-pumped Q-switched YAG laser from Quantronix is preferably used as the laser beam generator. This laser can generate 8-W rated average power and a wavelength of 532 nm. To examine the relationship between machining conditions and resulting damage, a single open groove was formed repeatedly by directly illuminating a laser beam without through the phase grating at various Q-switching frequencies. The experiments revealed that if a Q-switching frequency less than 10 kHz is employed, it is possible to form open grooves without damaging an ITO film and a glass substrate under the ITO film. It was also revealed that whether grooves can be formed or not is not determined by the Q-switching frequency but by the magnitude of the peak power.

FIGS. 5(*a*) and 5(*b*) illustrate the relationship between the laser output power and time, for Q-switching frequencies of 10 kHz and 30 kHz, respectively. If it is assumed that the peak power during a machining process is 150 W, then the pulse width and pulse energy become 150 nsec and 23 $\mu$J, respectively, for the Q-switching frequency of 10 kHz, and 300 nsec and 45 $\mu$J for 30 kHz. When an ITO film on a glass substrate was processed under the above conditions, no damage was observed if 10 kHz was employed as the Q-switching frequency. However, when 30 kHz was employed as the Q-switching frequency, micro damages were introduced at edges of grooves and at the surface of the glass substrate. The damage occurred when 30 kHz was used because a 30-kHz pulse has a greater pulse width, and thus excess energy was applied to the sample. When the peak power is greater than a threshold value required for machining, if the pulse width determined by the Q-switching frequency is greater than an allowable maximum value, then damage is introduced during the machining. Reducing the pulse energy with the intention of preventing the damage is not effective, since the peak power will become less than the threshold value required for machining.

In view of the above, and taking into account the beam division number and the machining speed, the Q-switching frequency and the rated average output power were determined as 10 kHz and 8 W, respectively. In this case, the pulse width and the peak power become 150 nsec and 5.3 kW, respectively. FIG. 33 illustrates the relationship between the laser output power and time in this embodiment.

Peak power greater than 110 W is required to form a single open groove on an ITO film having a thickness of 1500 Å. Therefore, it was decided that a laser beam having peak power of 5.3 kW be divided into 32 beams by using the above-described phase grating 1109. Furthermore, the 32 beams were subjected to the optical Fourier transform via a condensing lens so that the surface of an ITO film was illuminated with 32 beam spots at intervals of 200 $\mu$m. In this illumination, the diameter of each beam spot was 18 $\mu$m, and this beam spot produced a hole with a diameter of 10 $\mu$m in the ITO film. Thus, 32 holes each having a diameter of 10

μm were formed at the same time by illumination of one pulse. The relationship between the diameter of a beam spot and the diameter of a resulting hole is illustrated in FIG. 6. It should be noted that the diameter of a hole formed in the ITO film is smaller than the diameter of a beam spot because of the threshold property of the ITO film.

In a time interval of 100 μm before another pulse was generated, the substrate was moved 5 μm by using a precision stage, wherein this moving distance corresponds to one half the diameter of a hole produced by the beam illumination. In this way, 32 holes each having a diameter of about 10 μm were formed at a time with illumination of a pulse beam generated alternately by two laser beam generators, and this process was performed repeatedly thereby successfully producing continuous grooves each having a width of 10 μm at intervals of 200 μm, as shown in FIG. 34. In this processing, the stage wa moved at a constant speed of 50 mm/sec, and thus an effective machining speed of 1600 mm/sec can be achieved.

If the 32 beam spots are aligned along a line at a certain angle to the moving direction of the stage, the effective beam spot intervals or the intervals between resulting grooves can be adjusted to desired values. This can be accomplished by employing a rotary stage for rotating the phase grating in its plane. This adjustment mechanism allows high precision patterning of electrodes which can meet the required specifications of a liquid crystal panel. Furthermore, the mechanism can be used to readily perform trial production of liquid crystal panels having various electrode intervals.

According to the machining method and apparatus of the present invention, it is possible to pattern an ITO film to form grooves each having a width less than 10 μm. Therefore, it is possible to improve the aperture ratio and the contrast ratio of a liquid crystal panel wherein these are primary factors which dominate the display quality. In contrast, the minimum electrode gap which can be obtained by conventional photolithography techniques is 30 μm. This rather large gap is a main cause for degradation in the aperture ratio and in the contrast ratio of a liquid crystal panel.

In this embodiment, a lamp-pumped Q-switched YAG laser is used. Alternatively, a diode-laser-pumped Q-switched YAG laser may also be used. Furthermore, an YLF laser may also be used instead of the YAG laser to obtain a similar effect. In addition to solid state lasers, a gas laser which can operate in a pulse mode may also be used. The Q-switching frequency adequate for machining depends on the characteristics of a laser beam generator, and thus the Q-switching frequency is not limited only to 10 kHz which has been referred to in the present embodiment. Therefore, it is required to select a proper Q-switching frequency depending on the characteristics of a laser beam generator used and depending on the property of an object to be machined.

In the above embodiment, the invention has been described referring to the formation of grooves each having a width of 10 μm at intervals of 200 μm. However, the present invention can be readily applied to formation of other kinds of grooves by (1) changing the geometric period of the phase grating, and/or (2) changing the focal length of the condensing lens. Furthermore, the beam division number is not limited to 32, and can be determined according to specific requirements of a laser beam machining apparatus. For example, if required for machining, a phase grating which can divide a beam into 16 beams can be made according to the data shown in Table 2 or 4. The optimum beam division number should be determined taking the following factors into consideration: (1) The properties of an object to be machined; and (2) The output power of a laser beam generator used, and the number of laser beam generators. Taking the required machining capability into consideration, the beam division number is thus determined. According to the above, a phase grating proper for a specific application may be readily designed and made. Thus, the present invention is applicable for various applications.

(Embodiment 10)

An alignment film is formed on an ITO film substrate which has been processed using a laser beam machining apparatus according to any of embodiments 1 through 9. Molecules of liquid crystal material are aligned in a specific direction, for example, by rubbing the film with a cloth. A liquid crystal panel is assembled by encapsulating liquid crystal between two ITO film substrates which have been subjected to the orientation processing wherein electrode patterns formed on the ITO film substrates are perpendicular to each other. There are three known techniques as shown in FIG. 35 for mounting a driving circuit on the liquid crystal panel assembled in the above-described manner. The term "TAB" which will be used in the following description refers to "tape automated bonding", which generally means techniques for forming a driving circuit on a tape. In this description, the term "TAB" is used to represent a tape on which a driving circuit is formed. Known techniques of mounting a driving circuit include:

(1) A technique in which a TAB tape is connected at only one side of a panel.

The interconnection metal pitch of a TAB tape 10102 is equal to the pitch of pixel electrodes of a liquid crystal display panel. In this mounting technique, intermediate areas (for example, the area in which open grooves are oblique in FIG. 36) between a TAB tape and a liquid crystal panel are not necessary. It is only required to dispose a TAB tape on either the upper or lower side and either the left or right side of a liquid crystal display panel. This allows a great reduction in the installation space of the liquid crystal panel. The reduction in the installation space of the liquid crystal panel allows a reduction in total dimensions of a display apparatus and also a reduction in its weight. Therefore, it also becomes possible to add various functions. (Refer to FIG. 25(a).)

(2) A technique in which TAB tapes are disposed at both sides of a panel in a zigzag fashion.

TAB tapes have thermal shrinkage properties. In the first technique, therefore, in some cases, it is difficult to ensure that a TAB tape has sufficiently good accuracy in the interconnection pitch. In contrast, in this second technique, a plurality of TAB tapes 10202 having a proper length are disposed in a zigzag fashion at the upper and lower sides as well as at the left and right sides of a liquid crystal panel, thereby ensuring that TAB tapes have good accuracy in the interconnection pitch. Also in this technique, intermediate areas between pixel electrodes 10201 and TAB tapes 10202 are not necessary. (Refer to FIG. 15(b).)

(3) A technique in which TAB tapes are connected to a panel via intermediate area.

A laser beam is swung in the direction perpendicular to the stage movement direction by using for example a galvanomirror so as to produce an electrode pattern such as that shown in FIG. 36. This type of electrode pattern is used as an intermediate area 10303 to connect pixel electrodes 10301 to TAB tapes 10302. In this technique, it is impossible to achieve a great reduction in the installation space of a liquid crystal panel. However, conventional parts can be directly mounted, and therefore mounting costs are much lower than in techniques (1) or (2). (Refer to FIG. 35(c).)

FIG. 37(a) is a plan view of stripe electrodes of a simple matrix driven liquid crystal panel produced by a laser machining apparatus described in connection with any one of embodiments 1 through 9. In this example, the electrode pattern has an electrode pitch of 200 μm and a gap or space between adjacent electrodes of 10 μm. In FIG. 37(b), reference numeral 11101 denotes electrode gaps formed on the upper substrate, and reference numeral 11102 denotes electrode gaps formed on the lower substrate. In actual usage of an liquid crystal panel, the upper substrate is located at a side nearer to a user or an observer, and the lower substrate is located at the back side.

FIG. 37(b) is an enlarged schematic diagram illustrating stripe electrodes patterned by means of exposure via a photomask according to a conventional technique. In this figure, reference numeral 11201 denotes electrode gaps formed on the upper substrate, and reference numeral 11202 denotes electrode gaps formed on the lower substrate. In this example, the electrode pattern has an electrode pitch of 200 μm and a gap of 30 μm.

Major factors that determine the display quality of a liquid crystal panel are the electrode aperture ratio and the contrast ratio. The term "electrode aperture ratio" is used here to represent an effective electrode area that can contribute to the control of light transmittance (or reflectance). The electrode aperture ratio is defined as:

$$\alpha = (P-g)^2/P^2 = (1-g/P)^2 \quad (14)$$

where P is the electrode pitch, and g is the electrode gap. As a matter of course, $\alpha < 1$.

The contrast ratio is defined as the ratio of the maximum value to the minimum value of the light transmission (or reflectance), and can be written as $$C = x \cdot P^2/[P^2 - (P-g)^2] = x/(1-\alpha) \quad (15)$$

where x is a variable mainly depending on the orientation conditions of liquid crystal, the thickness of a liquid crystal layer, and driving conditions. From equations (14) and (15), it can be seen that there is a close correlation between the electrode aperture ratio and the contrast ratio.

Calculation of the electrode aperture ratio and the contrast ratio according to equations (14) and (15) gives the following results for two types of liquid crystal panels shown in FIG. 37. The electrode aperture ratio and the contrast ratio of the liquid crystal panel according to the present invention are 0.90 and 20, respectively. In contrast, the electrode aperture ratio and the contrast ratio of the liquid crystal panel according to the conventional technique are 0.72 and 3.6, respectively. Compared to these calculated values, typical measured values are as follows: the electrode aperture ratio and the contrast ratio of the liquid crystal panel of the present invention are 0.90 and 45, respectively, and 0.70 and 30 for the conventional panel.

With the laser machining apparatus according to the present invention, as described above, it is possible to reduce the electrode gap down to one third of that of the conventional panel (less than 10 μm), and increase the electrode aperture ratio and the contrast ratio by factors of 1.3 and 1.5 time, respectively. As a result, the liquid crystal panel according to the present invention can provide much better visibility performance than conventional techniques.

As described above, the laser machining apparatus according to the present invention has a variety of applications such as fine cutting processes, forming of fine holes, etc. In particular, the laser machining apparatus according to the present invention is suitable for patterning electrodes of a liquid crystal panel. The liquid crystal panel according to the present invention provides greater aperture ratio and contrast ratio and thus much higher display quality than conventional liquid crystal panels. Various other advantages will become apparent to one skilled in the art after being able to study the drawings, foregoing specification and following claims.

What is claimed is:

1. A method of laser machining comprising the steps of:
    alternately driving two Q-switched solid state laser beam generators for emitting a second harmonic wave in such a manner that there is a delay in the Q-switching phase between said two laser generators; forcing laser beams emitted by said two laser generators to travel along a common optical path; illuminating a transparent conductive film deposited on a substrate with a plurality of laser beams produced by a phase grating for dividing a laser beam into a plurality of laser beams; and moving said substrate or said plurality of laser beams; thereby forming grooves in said transparent conductive film.

2. A method of laser machining according to claim 1, wherein said transparent conductive film is an indium-tin-oxide (ITO) film.

3. A method of laser machining according to claim 1, wherein said laser generator is a YAG laser generator which emits the second harmonic wave.

4. A method of laser machining according to claim 1, wherein said laser generator is a YLF laser generator which emits the second harmonic wave.

5. A method of laser machining according to claim 1, wherein said transparent conductive film is illuminated with said plurality of laser beams projected at a substantially right angle onto said transparent conductive film.

6. A method of laser machining according to claim 1, wherein said transparent conductive film is illuminated with one line of laser beams produced by said means for dividing a laser beam.

7. A method of laser machining according to claim 1, wherein said transparent conductive film is illuminated with a plurality of lines of laser beams produced by said means for dividing a laser beam.

8. A method of fabricating a liquid crystal panel including a film on a substrate, said film having grooves produced thereon, said method comprising the steps of:
    forming a film on said substrate;
    driving a plurality of laser beams generated by a pulse laser beam generator;
    dividing each of said plurality of laser beams by a phase grating;
    moving at least one of said substrate and said plurality of laser beams relative to the other; and
    illuminating said film with said plurality of divided laser beams through a condensing lens to produce a plurality of grooves in said film.

9. The method of fabricating a liquid crystal panel according to claim 8 comprising the further step of forming said grooves in said film with a groove width less than or equal to 10 μm.

10. The method of fabricating a liquid crystal panel according to claim 8 comprising the further step of selecting said film from a conductive film material.

11. The method of fabricating a liquid crystal panel according to claim 10 comprising the further step of selecting said film from a transparent conductive film material.

12. The method of fabricating a liquid crystal panel according to claim 8 wherein the step of dividing each of said plurality of laser beams further comprises dividing each laser beam by both said phase grating and a polarized beam separator.

13. A method of fabricating a liquid crystal panel including a film on a substrate, said method comprising the steps of:

forming a film on said substrate;

illuminating said film with a plurality of laser beams, each of said laser beams being generated by a plurality of pulse laser beam generators and divided by a phase grating; and patterning said film with said laser beams.

14. The method of fabricating a liquid crystal panel according to claim 13 further comprising dividing each of said laser beams by both said phase grating and a polarized beam separator.

* * * * *